(12) United States Patent
Mahony

(10) Patent No.: US 6,496,641 B1
(45) Date of Patent: Dec. 17, 2002

(54) FIBER OPTIC INTERFACE DEVICE

(75) Inventor: Glenn M. Mahony, Alpharetta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/746,730

(22) Filed: Dec. 26, 2000

Related U.S. Application Data

(63) Continuation-in-part of application No. 09/372,675, filed on Aug. 12, 1999.

(51) Int. Cl.[7] .............................................. G02B 6/44
(52) U.S. Cl. .................................... 385/135; 385/134
(58) Field of Search ............................. 385/53, 54, 55, 385/76, 92, 135, 134

(56) References Cited

U.S. PATENT DOCUMENTS

| | | | | |
|---|---|---|---|---|
| 5,048,916 A | * | 9/1991 | Caron ........................ | 385/71 |
| 5,617,501 A | * | 4/1997 | Miller et al. ............... | 385/134 |
| 5,987,207 A | * | 11/1999 | Hoke ........................ | 385/135 |
| 6,009,225 A | * | 12/1999 | Ray et al. ................... | 385/135 |
| 6,081,644 A | * | 6/2000 | Stateczny et al. .......... | 385/135 |
| 6,160,946 A | * | 12/2000 | Thompson et al. ......... | 385/134 |
| 6,269,214 B1 | * | 7/2001 | Naudin et al. .............. | 385/135 |
| 6,301,407 B1 | * | 10/2001 | Donaldson ................. | 359/124 |
| 6,314,229 B1 | * | 11/2001 | Sasaki et al. ............... | 385/135 |

OTHER PUBLICATIONS

"Understanding Fiber Optics," Jeff Hecht, Prentice Hall, 3rd edition Jun. 1999, chapters 23–25.*
GR–20–CORE, *Generic Requirements for Optical Fiber and Optical Fiber Cable*, Issue 2, Jul. 1998.
GR–326–CORE, *Generic Requirements for Single-Mode Optical Connectors and Jumper Assemblies*, Issue 2, Dec. 1996.
GR–409–CORE, *Generic Requirements for Premises Fiber Optic Cable*, Issue 1, May 1994.

* cited by examiner

*Primary Examiner*—Brian Sircus
*Assistant Examiner*—Michael C. Zarroli
(74) *Attorney, Agent, or Firm*—Shaw Pittman LLP

(57) ABSTRACT

A fiber optic interface device that facilitates the deployment of fiber to the home by connecting a connectorized outside fiber optic drop to a connectorized inside fiber optic drop, the fiber optic interface device including a housing having two ports, termination hardware, routing hardware, and one or more adapters. The housing provides environmental protection and is adapted to be mounted to a customer's house. The two ports receive the outside and inside drops. Positioned above the ports inside the housing, the termination hardware secures the drops to the housing. The routing hardware receives the drops from the ports, routes the drops to the one or more adapters, and stores any extra length in the drops, while maintaining a proper fiber strand bend radius. The one or more adapters connect the outside drop to the inside drop, providing a well-aligned and stable fiber optic connection that does not require splicing.

17 Claims, 17 Drawing Sheets

FIBER OPTIC INTERFACE DEVICE

This is a continuation-in-part of application Ser. No. 09/372,675, filed Aug. 12, 1999, which is hereby incorporated by reference in its entirety. In addition, this application incorporates by reference the following co-pending related applications in their entireties: application No. Ser. 09/746,649, "Connectorized Outside Fiber Optic Drop," by Glenn M. Mahony, filed Dec. 26, 2000; and application Ser. No. 09/746,528, "Connectorized Inside Fiber Optic Drop," by Glenn M. Mahony, filed Dec. 26, 2000.

BACKGROUND

1. Field of the Invention

The present invention relates to fiber optic cable systems and, more specifically, to a fiber optic interface device for providing continuous, uninterrupted fiber optic service from a service provider central office to a subscriber premises.

2. Definitions

The following definitions and descriptions are provided to clearly define the intended meanings of certain terms used throughout this application.

1. Primary fiber optic strand—a fiber optic strand that is connected to an electronic device in the central office of a service provider. A primary fiber optic strand supports a single fiber optic electronic device in the central office and up to 32 different fiber optic electronic devices external to the central office, i.e., one fiber optic strand can be split into 32 different strands for connection to 32 different fiber optic electronic devices.

2. Fiber optic cable—a cable that contains a multiple number of fiber optic strands.

3. Distribution splitter—a splitter used in the intermediate portion of a deployment network, where fiber optic strands are separated and directed to different locations. Distribution splitters divide a single fiber optic strand into multiple numbers of strands.

The number of splitters in a network depends on the total number of strands in the fiber optic cable leading into a central office. The total number of strands in the cable is at least equal to the number of fiber optic electronic devices connected at the central office.

For purposes of describing the present invention, it is understood that, although only two levels of splitting are described herein, any number of levels could be used to divide a primary fiber optic strand into multiple strands. In fact, instead of using distribution splitters and local terminals, a single primary fiber optic strand could go directly to a local terminal with a 1×32 splitter, in which case the local terminal splits the strand into 32 separate strands which may be connected to 32 individual fiber optic drops leading to one or more subscriber premises.

4. Secondary fiber optic strand—the strands that are separated from a primary fiber optic strand. When a primary fiber optic strand goes through a first distribution splitter, the separated strands are referred to as secondary fiber optic strands. The number of secondary fiber optic strands in the network depends upon the configuration of the splitter, e.g., a 1×8 splitter would split a primary fiber optic strand into eight secondary fiber optic strands. Through each set of splitters, the number of fiber optic electronic devices supported becomes progressively smaller until there is only one device per strand.

5. Splice case or splicer—case that attaches to a fiber optic cable and separates one or more fiber optic strands from the cable to be diverted away from the cable in a different direction. A splice case contains fiber optic splices or permanent connections between two fiber optic strands.

6. Local terminal—an outside plant cable terminal used in the prior art for terminating one or more fiber optic strands near one or more subscriber premises for connection to copper wire drops into each subscriber premises. Under the current invention, a local terminal includes a splitter-terminal apparatus that splits a final fiber optic strand into multiple strands, each fitted with a connectorized termination for joining one fiber optic drop.

7. Fiber optic drops—small fiber optic cables that contain one or two fiber optic strands connecting, for example, the local terminal to a fiber optic interface device or a fiber optic interface device to an optical network terminal.

8. Connectorized termination—a fitting for a fiber optic cable or strand that facilitates quick connections between two different cables or strands. The fittings are typically plastic connectors with a male and female side, e.g., SC connectors.

9. Pigtail—in the context of a splitter-terminal, pigtail refers to a short length of jacketed fiber optic strand permanently fixed to a component at one end and a connectorized termination at the other end, such that the pigtail provides a flexible fiber optic connection between the component and the connectorized termination. When used in the context of a fiber optic drop, pigtail refers to a short length of jacket (the fiber optic strand is described separately) fixed to a component (sheath) at one end and a connectorized termination at the other end.

BACKGROUND OF THE INVENTION

The telecommunications industry has long recognized the many advantages fiber optic cabling and transmission devices hold over traditional copper wire and transmission systems. Fiber optic systems provide significantly higher bandwidth and greater performance and reliability than standard copper wire systems. For example, fiber optic systems can transmit up to 10 gigabits per second (Gbps), while copper lines transmit at typically less than 64 kilobits per second (Kbps). Optical fibers also require fewer repeaters over a given distance to keep a signal from deteriorating. Optical fibers are immune to electromagnetic interference (from lightning, nearby electric motors, and similar sources) and to crosstalk from adjoining wires. Additionally, cables of optical fibers can be made smaller and lighter than conventional copper wire or coaxial tube cables, yet they can carry much more information, making them useful for transmitting large amounts of data between computers and for carrying bandwidth-intensive television pictures or many simultaneous telephone conversations.

Despite the many advantages, extremely high installation costs have discouraged network providers from providing continuous fiber optic networks extending from central office facilities all the way to subscriber premises. As used herein, "fiber to the home" (FTTH) refers to this continuous deployment of fiber optic lines directly to subscriber premises. On the main distribution lines of a telecommunications network, the volume of traffic and number of customers often justify the high installation cost of fiber optic lines. However, thus far, the costs of deploying fiber optic lines to individual subscriber premises have far outweighed any potential benefits to network providers.

Therefore, instead of implementing FTTH networks, service providers have developed strategies to provide some of the benefits of fiber optic networks without actually deploying fiber all the way to the home (or other end-subscriber location). One such strategy is known as fiber to the curb (FTTC), in which fiber optic lines extend from the service provider to local terminals (also referred to as outside plant cable terminals) that are situated in areas having a high concentration of subscribers. Service providers complete the last leg of the network, i.e., from the local terminals into a subscriber premises, using copper wire drops and perhaps a high speed data connection, such as an Asynchronous Digital Subscriber Line (ADSL).

Such FTTC systems provide the benefits of fiber optic systems as far as the fiber extends, but deprive the subscriber of the full benefit of fiber optic networks because of the copper wire drops. Indeed, as the weakest link, the copper wire drops limit the bandwidth capacity for the entire system. Thus, the only way to gain the full benefit of fiber optic networking is to use a continuous fiber optic connection from the service provider's equipment to the subscriber's equipment.

Despite the bandwidth limitations, network providers favor copper wire drops because of the prohibitively high cost of installing fiber optic drops using conventional systems and methods. The bulk of these costs can be attributed to the highly skilled labor and time required to install fiber optic splitters and to join fiber optic drops to fiber optic strands coming from the splitters. In conventional systems and methods, fiber optic networks use fiber optic splitters and splice cases to route fiber optic strands throughout a distribution network. The fiber optic splitters and splice cases allow a fiber optic strand to branch into multiple strands to widen a network's coverage area. In conventional networks, design engineers use splitters and splice cases to route strands from electronic devices at the central office to distribution locations, such as those in housing developments.

To provide fiber optic drops to individual subscriber premises from the distribution locations, network providers could manually splice individual fiber optic drops onto each strand. Or, alternatively, each time that a new subscriber requires fiber optic service, a network provider could manually fit the fiber optic strands with a connector for joining a fiber optic drop that runs to the new subscriber's premises. However, whether manually splicing individual fiber optic drops or fitting fiber optic strands with connectors for each service request, network providers must use highly skilled technicians to complete the specialized tasks. These technicians tend to be both expensive and in short supply. Thus, in light of the conventional systems and methods for deploying fiber optic cable, network providers rightly view the deployment of individual fiber optic drops from these distribution locations as an expensive and time-consuming endeavor.

To avoid the high costs of manually splicing fiber or fitting connectors onto fiber, network providers could use conventional fiber optic splitters to facilitate connections. However, conventional fiber optic splitter apparatus are difficult to connect. The fiber optic splitters known in the prior art are designed to accommodate permanent connections. The splitters are installed at network branch locations at which the number and structure of incoming and outgoing strands rarely change. In contrast, in deploying fiber to the home from the distribution locations, network providers must have the flexibility to add and disconnect services on an individual subscriber level. Thus, the permanent nature of conventional fiber optic splitter apparatus is inappropriate for fiber to the home deployment.

Thus, in a typical network, instead of providing fiber optic drops from the distribution locations to the subscriber premises, network providers run fiber optic strands from the distribution locations to electronic devices located in local terminals, e.g., aerial or buried terminals. These local terminals are situated in the center of a cluster of subscriber houses. The fiber optic service ends at these local terminals, and copper wire drops complete the connection to the subscriber premises. The copper wire drops are used because no device exists in the prior art that facilitates an economical, easy-to-connect fiber optic drop to the subscriber premises. Although the prior art includes fiber optic splitters and splices for network deployment, the existing splitters and splices are not appropriate for installing individual drops to subscribers because they do not provide a terminating function and they are not combined into an easy-to-deploy unit.

In addition, because the prior art lacks a device to connect a fiber optic drop to a subscriber premises, the prior art also lacks devices for implementing fiber to the home from the distribution locations to the subscriber's equipment inside the subscriber's premises. Thus far, connecting distribution locations to subscriber equipment has been limited to copper. Devices that bring copper from the curb into the home are well known in the art. For example, one such device is a network interface device produced by Corning Cable Systems of Hickory, N.C. In stark contrast, however, the prior art lacks devices dedicated to bringing fiber from the curb to the home.

SUMMARY OF THE INVENTION

The present invention is a fiber optic interface device that facilitates the deployment of fiber to the home. The fiber optic interface device includes a housing having two ports, termination hardware, routing hardware, and one or more adapters. The housing protects the interior components against environmental hazards and is adapted to be mounted to a customer's house. The two ports of the housing receive outside and inside fiber optic drops. Positioned above the ports inside the housing, the termination hardware secures the outside and inside fiber optic drops to the housing. The routing hardware receives the drops from the ports, routes the drops to the one or more adapters, and stores any extra length in the drops, all while maintaining a proper bend radius for the fiber optic strands. Finally, the one or more adapters connect the outside drop to the inside drop, providing a well-aligned and stable fiber optic connection that eliminates the need for splicing.

In facilitating the deployment of fiber to the home, the present invention functions within a fiber optic network that provides continuous fiber optic strands from a service provider's central office to individual subscribers' premises. As shown schematically in FIG. 1a, the network comprises a central office fiber optic electronic device, a primary fiber optic cable (or strand), distribution splitters, secondary fiber optic cables (or strands), local terminals (outside plant cable terminals), and fiber optic drops to subscriber premises. In replacing the inferior fiber to the curb deployments of the prior art, the present invention facilitates a system that economically deploys complete, uninterrupted fiber optic services to individual subscribers.

To facilitate fiber to the home, the present invention helps connect the local terminals of the network to the subscriber premises, i.e., the present invention helps to extend fiber from the "curb" to the "home." As shown in FIG. 1b, this portion of the network includes a fiber optic splitter-terminal apparatus in the local terminal, a connectorized outside fiber drop in communication with the fiber optic splitter-terminal apparatus, a fiber optic interface device of the present invention in communication with the connectorized outside fiber drop, and a connectorized inside fiber drop in communication with the fiber optic interface device. The connectorized inside fiber drop connects to optical network terminals in the subscriber premises, which in turn connect to the subscriber's fiber optic electronic devices. The fiber optic electronic devices connect to home consumer electronic devices, such as personal computers or telephones. Together, these components enable the cost-effective installation of fiber to the home.

Accordingly, an object of the present invention is to provide a fiber optic network that delivers uninterrupted fiber optic service from a central office to subscriber premises.

Another object of the present invention is to connect an outside fiber optic drop to an inside fiber optic drop without requiring splicing.

Another object of the present invention is to provide, in a fiber to the home network, a convenient test point for verifying service and diagnosing service problems at an individual subscriber premises.

Another object of the present invention is to provide a clear demarcation point between material and equipment owned by a fiber optic service provider and material and equipment owned by a customer of the service provider.

Another object of the present invention is to provide a flexible maintenance point from which to repair and replace fiber optic drops without requiring splicing.

Another object of the present invention is to protect a connection between an outside and inside fiber optic drop from environmental hazards.

These and other objects of the present invention are described in greater detail in the detailed description of the invention, the appended drawings, and the attached claims.

DETAILED DESCRIPTION OF THE INVENTION

The present invention is a fiber optic interface device that connects a connectorized outside fiber optic drop to a connectorized inside fiber optic drop. In serving this function, the present invention facilitates the deployment of fiber to the home. To provide the context in which the present invention operates, the following subheadings describe the present invention, a representative fiber optic network deployment system that uses the present invention, and the specific components with which the present invention interacts as a part of that system.

Figure 1A:
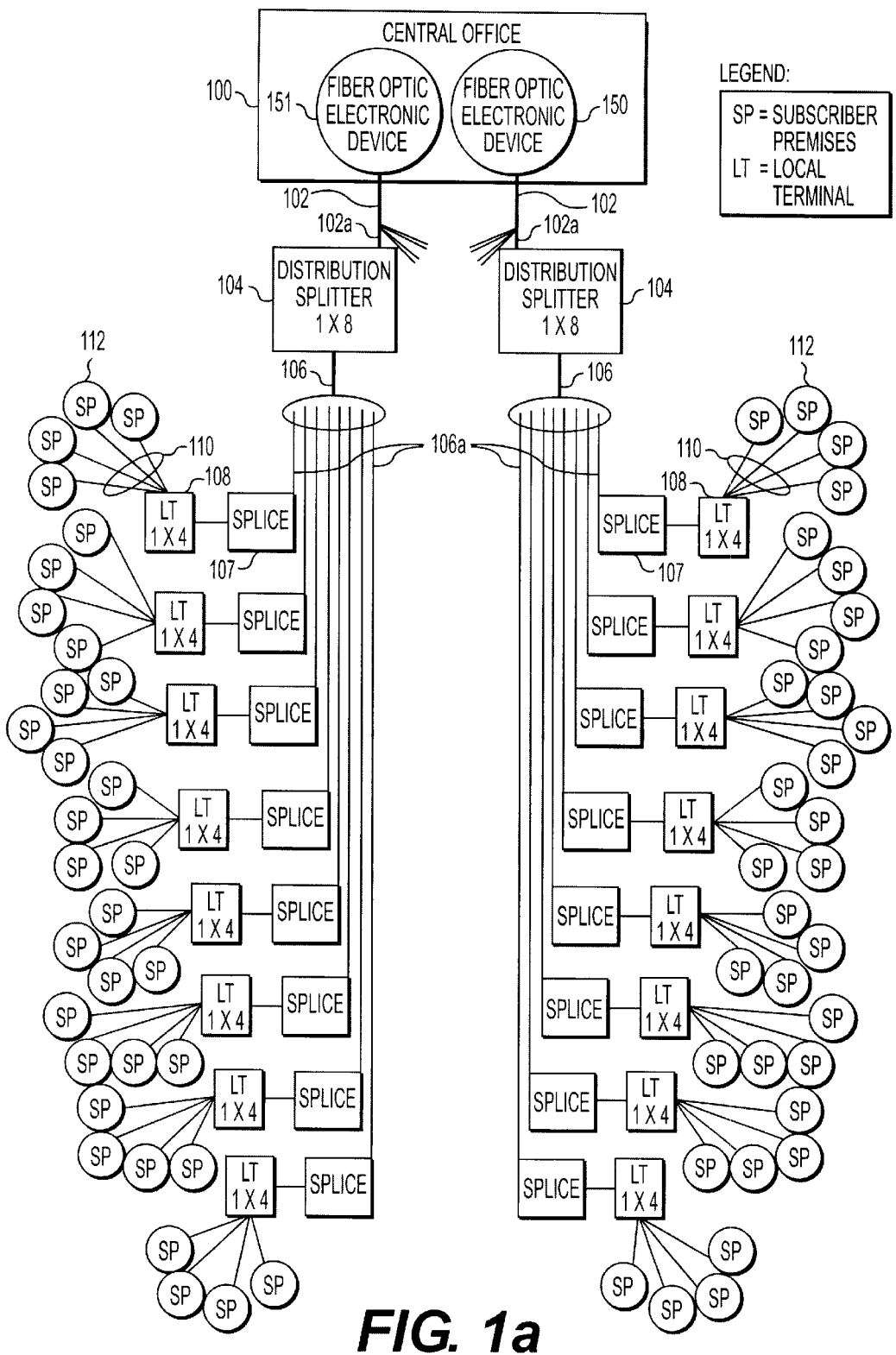
FIG. 1a is a schematic diagram of a fiber optic network from a central office to subscriber premises, according to a representative embodiment of the present invention.
Figure 1B:
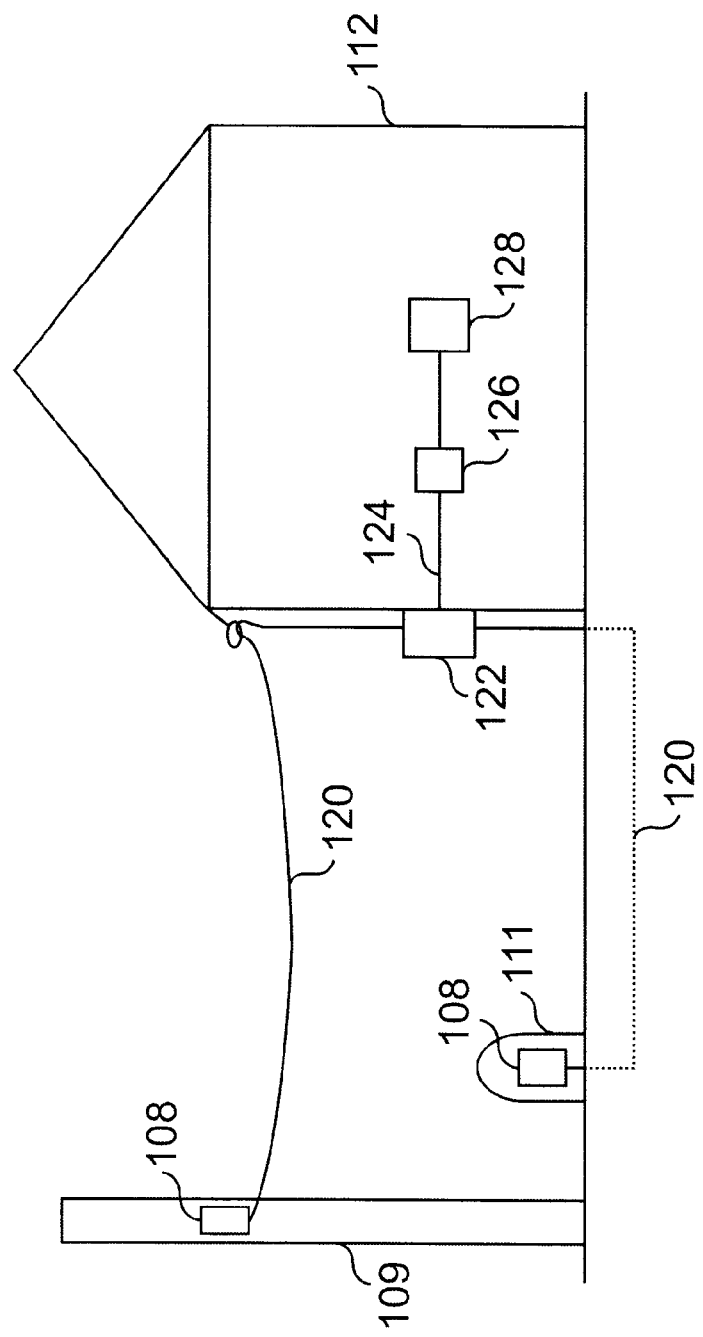
FIG. 1b is a schematic diagram of the distribution of a fiber optic drop from a local terminal to a subscriber premises, according to preferred embodiments of the present invention.

Fiber Optic Network Deployment System:

FIGS. 1a and 1b illustrate a complete fiber to the home deployment system, according to a representative embodiment of the present invention. FIG. 1a shows the distribution of fiber optic lines on a network level. On an individual subscriber level, FIG. 1b shows the distribution of a fiber optic drop from a local terminal to a subscriber premises.

As shown in FIG. 1a, a representative embodiment of the fiber to the home deployment system of the present invention includes a central office 100, a primary fiber optic cable 102 having a plurality of primary fiber optic strands 102a, a plurality of distribution splitters 104, a plurality of secondary fiber optic cables 106 having a plurality of secondary fiber optic strands 106a, a plurality of local terminals 108 (outside plant cable terminals), each containing a fiber optic splitter-terminal apparatus (not shown in FIG. 1a), a plurality of fiber optic drops 110, and a plurality of subscriber premises electronic equipment 112.

As shown in FIG. 1a, the system components are connected in a branched network. Starting from the central office 100, primary fiber optic cables 102 run from the service provider to locations throughout the network. At various points in the network, primary fiber optic strands 102a are spliced from primary fiber optic cables 102 into a plurality of distribution splitters 104. Each distribution splitter 104 divides a primary fiber optic strand 102a into a secondary fiber optic cable 106. As secondary fiber optic cable 106 passes near clusters of subscribers, splice cases 107 splice secondary fiber optic strands 106a off of secondary fiber optic cable 106 to be directed toward the respective service areas. The number of secondary fiber optic strands 106a in cable 106 supported by primary strand 102a depends on the configuration of distribution splitter 104. For example, a 1×8 distribution splitter splits a primary fiber optic strand into eight secondary fiber optic strands 106a. Each of the eight secondary fiber optic strands 106a accommodates four electronic devices for a total of thirty-two supported end devices per primary fiber optic strand 102a.

Within a service area, each secondary fiber optic strand 106a is in communication with a local terminal 108. Local terminals 108 include a splitter-terminal apparatus for further splitting secondary fiber optic strand 106a into a plurality of fiber optic drops 110. The splitter-terminal apparatus replaces the conventional fiber-to-copper interface and provides a fiber optic connector interface between a fiber optic strand and multiple fiber optic drops to subscriber premises. Each fiber optic drop 110 serves one fiber optic electronic device on subscriber premises 112 (assuming, of course, that local terminals 108 split secondary fiber optic strands 106a into fiber optic drops 110 of a single strand).

In dividing primary fiber optic cable 102 down to a single fiber optic drop 110, the representative network of FIG. 1a uses the following distribution scheme. For simplicity, this example assumes that one primary fiber optic strand 102a extends from central office fiber optic electronic device 150. In other words, primary fiber optic cable 102 consists of one primary fiber optic strand 102a. From central office 100, primary fiber optic strand 102a goes through one 1×8 distribution splitter 104, resulting in eight separate secondary fiber optic strands 106a. These eight secondary fiber optic strands are bundled in secondary fiber optic cable 106. At locations near each service area, splice cases 107 splice secondary fiber optic strands 106a off of secondary fiber optic cable 106 and direct secondary fiber optic strands 106a toward intended service areas. Once inside the service areas, the eight secondary fiber optic strands 106a are routed to local terminals 108 that contain 1×4 splitter-terminal packages. Each 1×4 splitter-terminal package yields four separate fiber optic drops 110, for a total of 32 separate fiber optic drops. In this example, local terminals 108 are situated between four subscriber premises 112, with each subscriber having one fiber optic electronic device. Thus, 32 subscribers each having one fiber optic electronic device, are served from a single primary fiber optic strand 102 from central office 100.

FIG. 1b shows the fiber to the home deployment system on the individual subscriber level, from a local terminal 108 to a subscriber premises 112. In other words, FIG. 1b illustrates the specific components that form the fiber optic drops 110 of FIG. 1a. As shown in FIG. 1b, this portion of the fiber optic network deployment system includes a connectorized outside fiber drop 120, a fiber optic interface device 122, and a connectorized inside fiber drop 124. Connectorized outside fiber drop 120 is in communication with local terminal 108 and fiber optic interface device 122, and can be deployed from a pole 109 in an aerial application or from a pedestal 111 in a buried application. Fiber optic interface device 122 is mounted on subscriber premises 112. In turn, connectorized inside fiber drop 124 is in communication with fiber optic interface device 122 and optical network terminal 126. Optical network terminal 126 provides a termination point to which a subscriber fiber optic electronic device 128 can be connected. A home consumer electronic device, such as a personal computer, television, or telephone, is then connected to subscriber fiber optic electronic device 128. Thus, as illustrated in FIGS. 1a and 1b, the representative fiber optic network deployment system of the present invention provides complete, uninterrupted fiber optic service from central office 100 to subscriber fiber optic electronic devices 128.

The representative fiber optic network deployment system can support data, analog video, and voice transmission, with each configuration requiring a different type of fiber optic electronic device 150 in central office 100. In addition, for voice, video, or data transmission, a plurality of optical line terminals would be connected to the plurality of primary fiber optic strands 102a in cable 102. A preferred embodiment of the deployment system eliminates the use of active components (e.g., remote terminal sites containing multiplexers, host digital terminals, digital loop carrier systems, and other electronic equipment) throughout the distribution network. This preferred deployment system uses active components only at the ends of the network, i.e., in the service providers' central office electronic equipment and the electronic equipment located in subscribers' premises. The resulting passive optical network greatly reduces the probability of trouble reports and decreases the cost of provisioning, maintaining, and repairing the system.

Figure 1C:
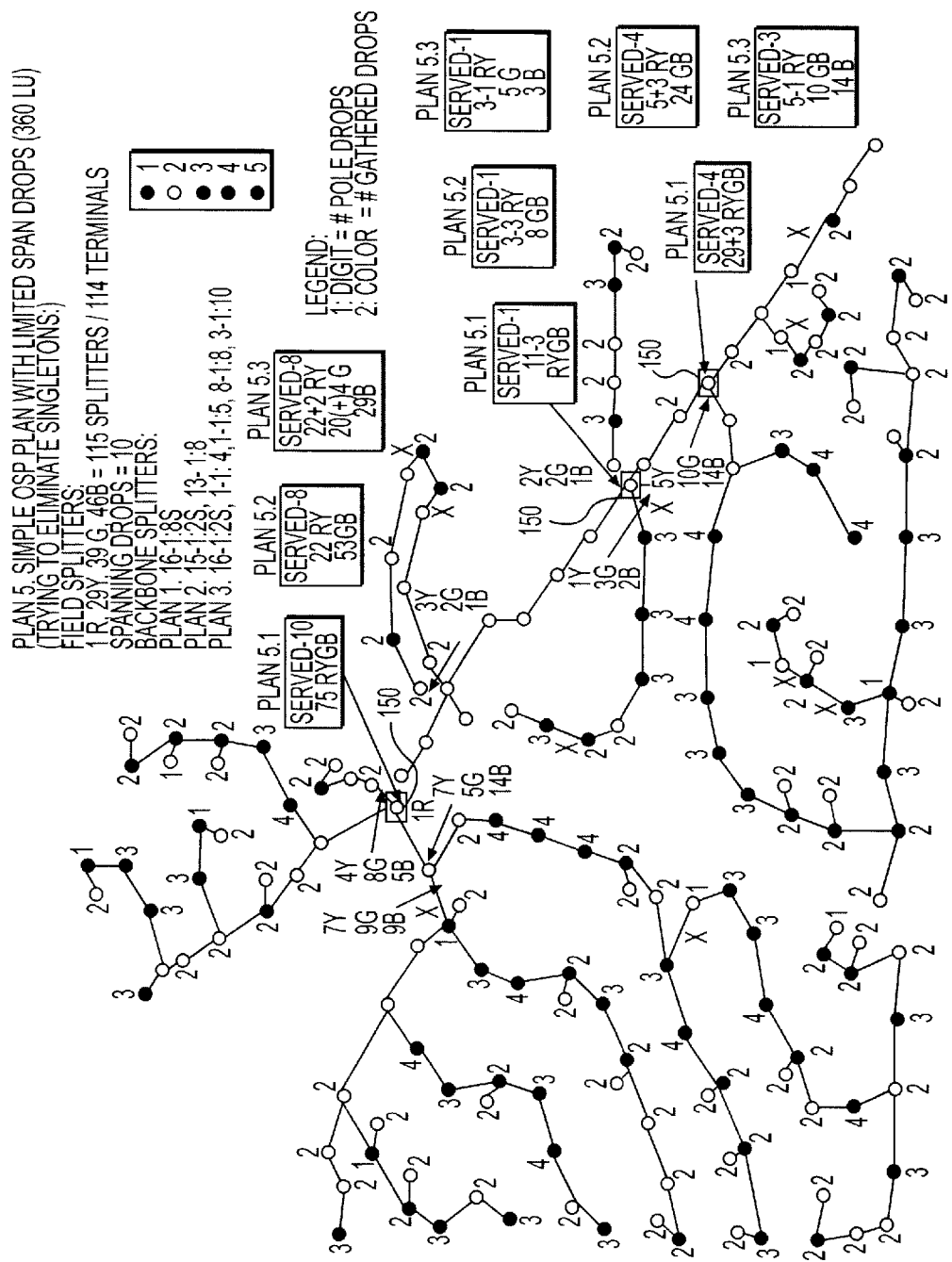
FIG. 1c is a schematic diagram of a fiber optic network, showing the deployment to individual subscriber premises, according to a representative embodiment of the present invention.

FIG. 1c illustrates a fiber optic deployment within a community of subscribers. The primary fiber optic cable from the central office enters the community at three hub locations 150. At these locations 150, the primary strands are split and diverted to individual branches. Along the branches, a multiple number of terminals are present. Each terminal location along these branches indicates the number of drops leading to individual fiber optic electronic devices at subscriber locations.

Splitter-Terminal Apparatus

A splitter-terminal apparatus combines into a single inexpensive apparatus a means for splitting and terminating a fiber optic strand for deployment to a cluster of subscriber premises. The splitter-terminal provides easily accessible, easily connectable terminations from which to run fiber optic drops to subscriber premises. Further, the splitter-terminal apparatus provides strain relief for the delicate fiber optic strands being split or being joined to the fiber optic drops. Finally, as described below, the splitter-terminal apparatus can be modified to accommodate aerial and buried deployment applications.

Figure 2B:
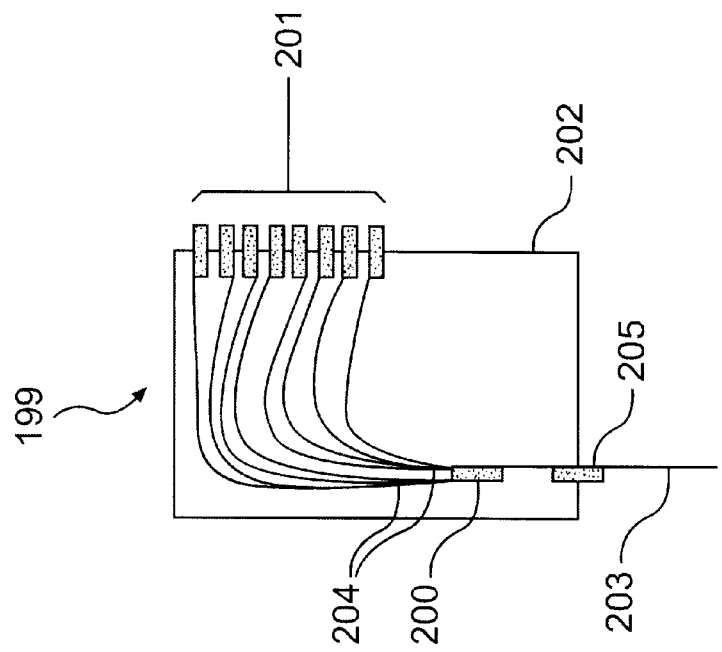
FIG. 2b is a schematic diagram of a splitter-terminal package with a 1×8 splitter and a connectorized termination for the incoming fiber optic strand, according to a representative embodiment.
Figure 2A:
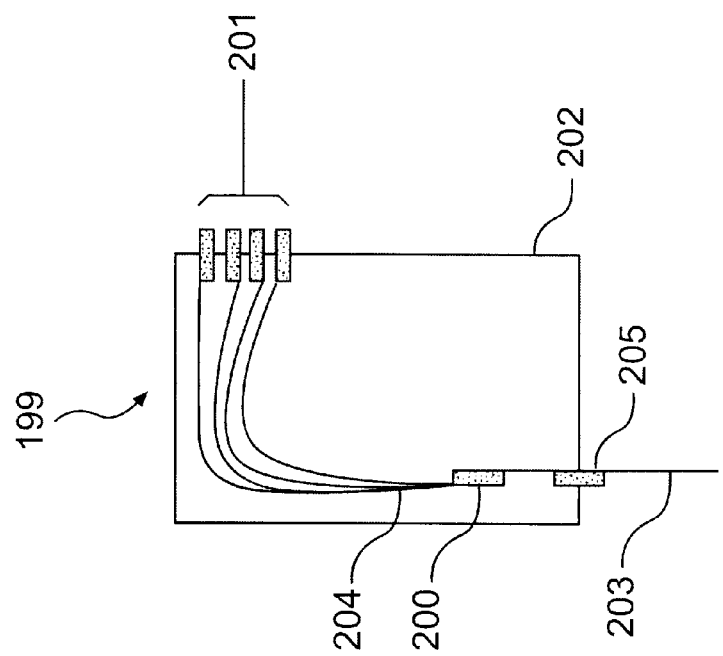
FIG. 2a is a schematic diagram of a splitter-terminal package with a 1×4 splitter and a connectorized termination for the incoming fiber optic strand, according to a representative embodiment.

As shown in FIG. 2a, the preferred embodiment of the splitter-terminal apparatus is a splitter-terminal package 199 that includes a splitter 200, a plurality of outgoing connectorized terminations 201, and a housing 202. Connectorized terminations 201 could be made with any number of connection fittings known in the art, e.g., SC connectors or ST connectors. Splitter 200 receives incoming fiber optic strand 203 and splits the strand into a plurality of single fiber optic strands 204. Single fiber optic strands 204 connect to the plurality of outgoing connectorized terminations 201. Splitter 200 and connectorized terminations 201 are attached to housing 202 to maintain a fixed distance between the components and to provide strain relief to the delicate fiber optic strands enclosed within housing 202.

The capacity of incoming fiber optic strand 203 and the configuration of splitter 200 dictate the maximum number of strands making up the plurality of single fiber optic strands 204. The number of connectorized terminations making up the plurality of outgoing connectorized terminations 201 is equal to the number of lines making up the plurality of single fiber optic strands 204. As an example, splitter 200 could be a 1×4 splitter in which an incoming fiber optic strand 203 is split into four separate strands 204 that connect to four separate outgoing connectorized terminations 201, as shown in FIG. 2a.

In a preferred embodiment of the splitter-terminal apparatus, incoming fiber optic strand 203 is connected to incoming connectorized termination 205 mounted in the wall of housing 202. In this manner, splitter-terminal package 199 is self-contained, with connectorized terminations 201 and 205 on each end. Connectorized terminations 201 and 205 enable fiber optic service providers to quickly and easily install the splitter-terminal package 199 between a splice case and a fiber optic drop to a subscriber home.

Figure 2D:
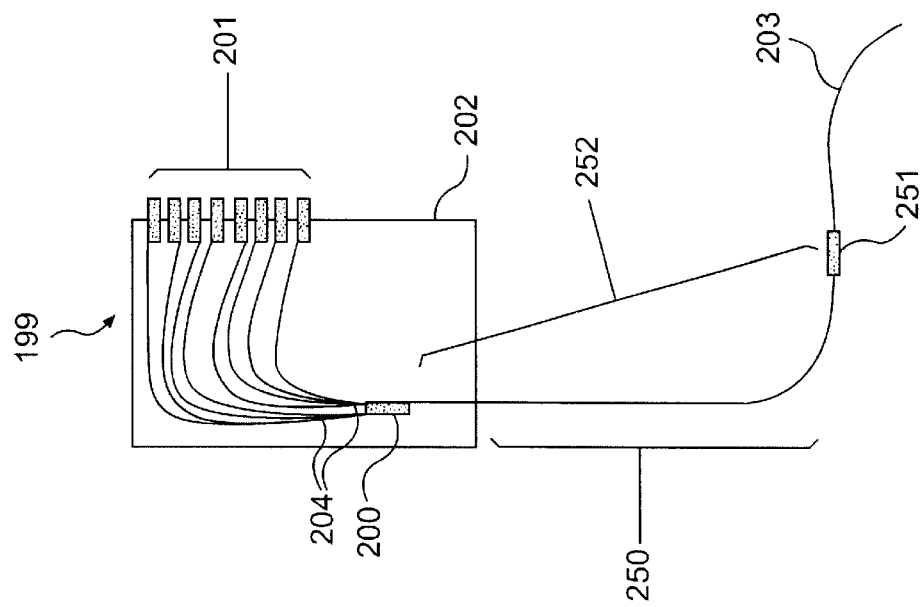
FIG. 2d is a schematic diagram of a splitter-terminal package with a 1×8 splitter and a pigtail for the incoming fiber optic strand, according to a representative embodiment.
Figure 2C:
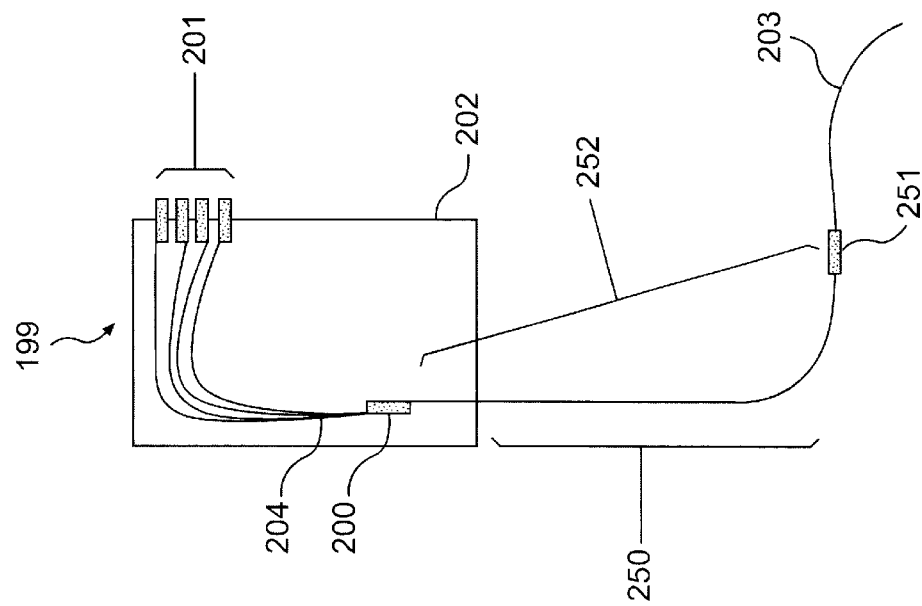
FIG. 2c is a schematic diagram of a splitter-terminal package with a 1×4 splitter and a pigtail for the incoming fiber optic strand, according to a representative embodiment.

In another embodiment of the splitter-terminal apparatus, shown in FIGS. 2c and 2d, the splitter-terminal package includes a pigtail permanently connected to the splitter. In this embodiment, the free end of the pigtail is fitted with a connectorized termination for easily connecting to an incoming fiber optic strand. This pigtail extends through the wall of the splitter-terminal housing so that the internal splitter-terminal components remain protected by the housing. As shown in FIG. 2c, in another embodiment of the splitter-terminal apparatus, fiber optic strand 252 extends from splitter 200 through housing 202 to connectorized termination 251, forming pigtail 250. In this embodiment, splitter-termination package 199 in FIG. 2c is a self-contained package similar to splitter-termination package 199 in FIG. 2a. However, pigtail 250 provides more flexibility in reaching an adjacent splice case. These pigtails are more suited for manufactured assemblies, where an entire splitter-terminal package is delivered to the field.

Figure 3:
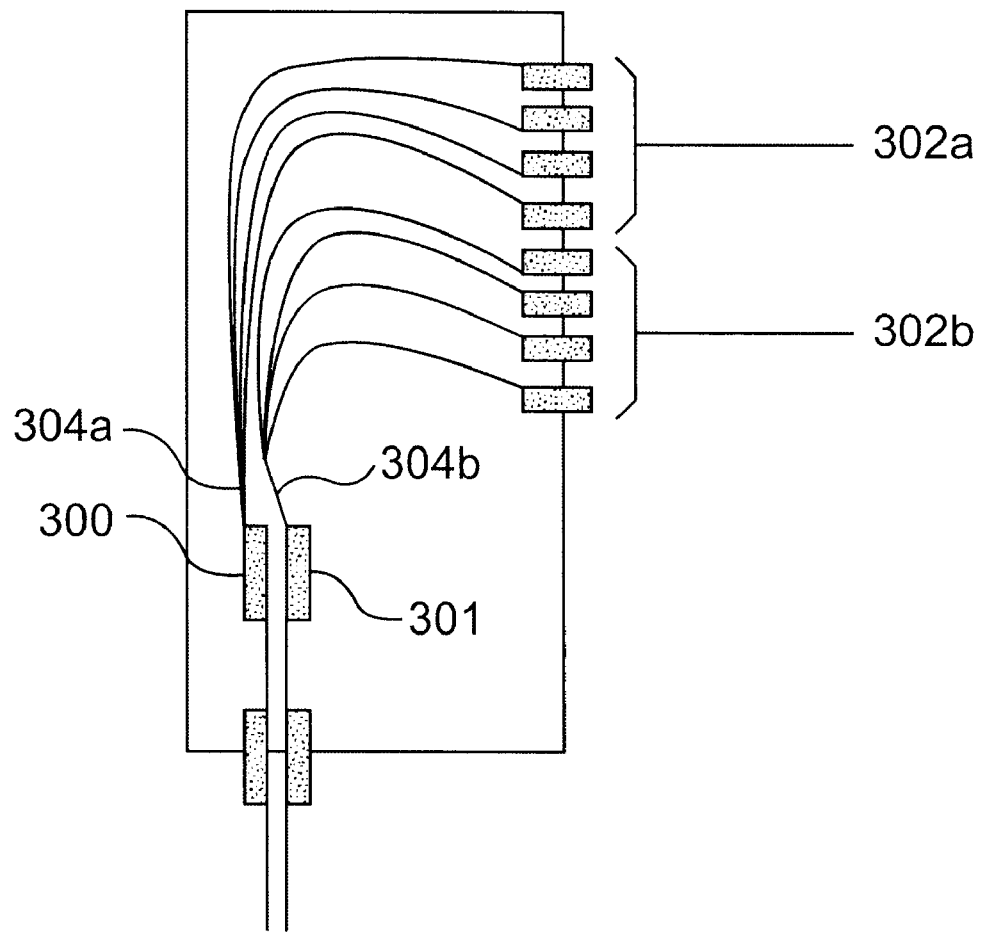
FIG. 3 is a schematic diagram of a splitter-terminal package with two incoming fiber optic strands and two 1×4 splitters, according to a representative embodiment.

A splitter-termination package could be arranged in a variety of ways, depending on the capacity of the incoming fiber optic strand and the configuration of the splitter. For instance, instead of the 1×4 splitter shown in FIG. 2a, a 1×8 splitter could be used, thereby requiring eight outgoing connectorized terminations. FIGS. 2b and 2d illustrate this 1×8 configuration with eight strands making up the plurality of single fiber optic strands 204 and eight connectorized terminations making up the plurality of outgoing connectorized terminations 201. Further, to accommodate two incoming fiber optic strands, e.g., one for data and one for video, two splitters could be used to separate the two incoming fiber optic strands. FIG. 3 shows two incoming strands leading into two 1×4 splitters 300 and 301, with two separate pluralities of outgoing fiber optic strands 304a and 304b leading to outgoing connectorized terminations 302a and 302b.

In a further representative embodiment of the splitter-terminal apparatus, splitter-terminal package 199 is installed as a component of a larger deployment system, e.g., a pole-mounted aerial system, a strand-mounted aerial system, or a pedestal-mounted system for buried lines. These larger deployment systems include a splice case and fiber optic drops, in addition to the splitter-terminal package. The splice case connects to a secondary fiber optic cable and separates a secondary fiber optic strand from the bundle. The separated strand becomes the incoming fiber optic strand connected to the incoming side of the splitter-terminal package. As shown in FIGS. 4a through 6c, splitter-terminal package 199 is installed between splice case 400 and the plurality of fiber optic drops 404 leading to the subscriber premises.

Figure 4A:
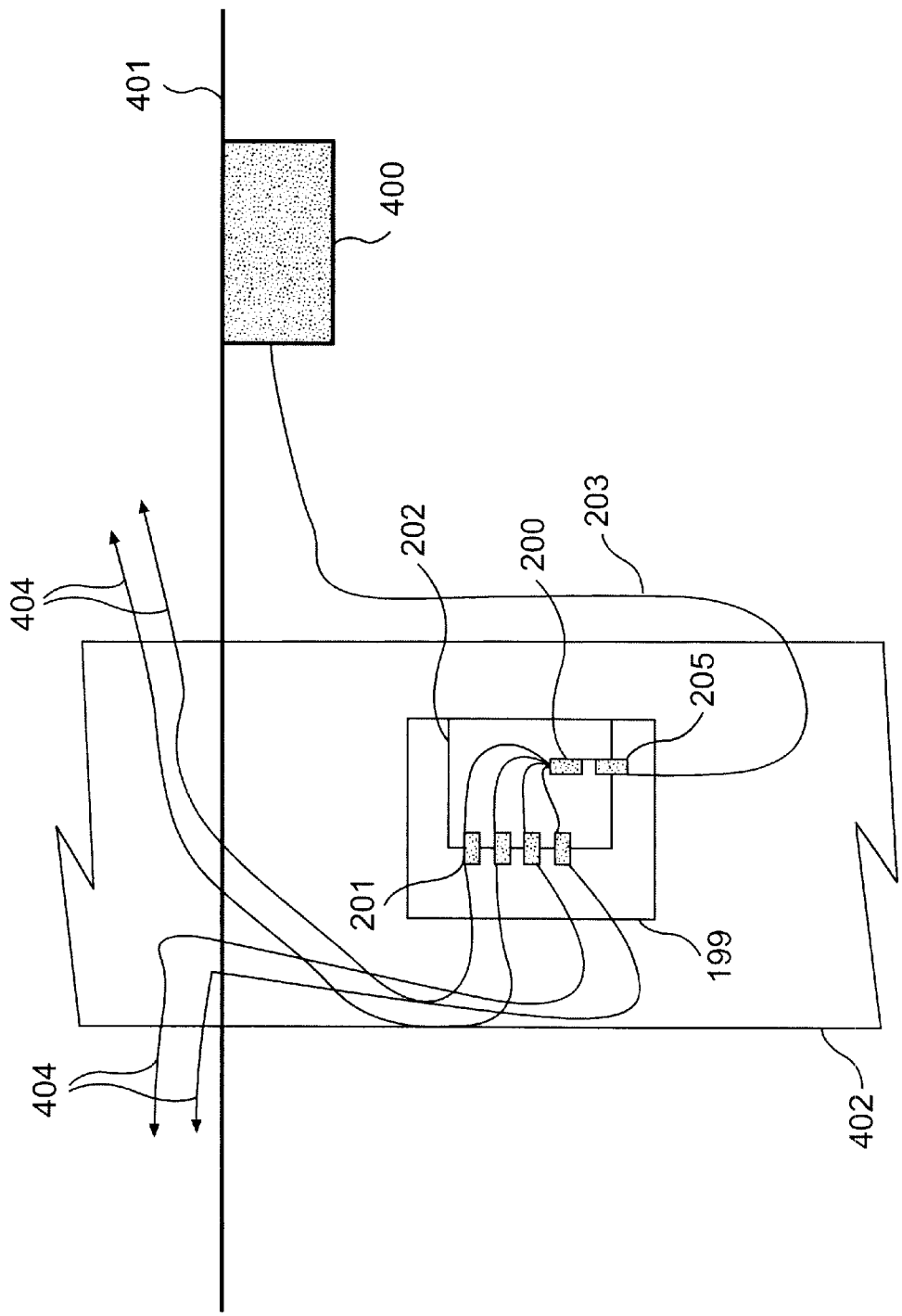
FIG. 4a is a schematic diagram of a pole-mounted splitter-terminal package for an aerial deployment system with a connectorized termination for the incoming fiber optic strand, according to a representative embodiment.
Figure 4B:
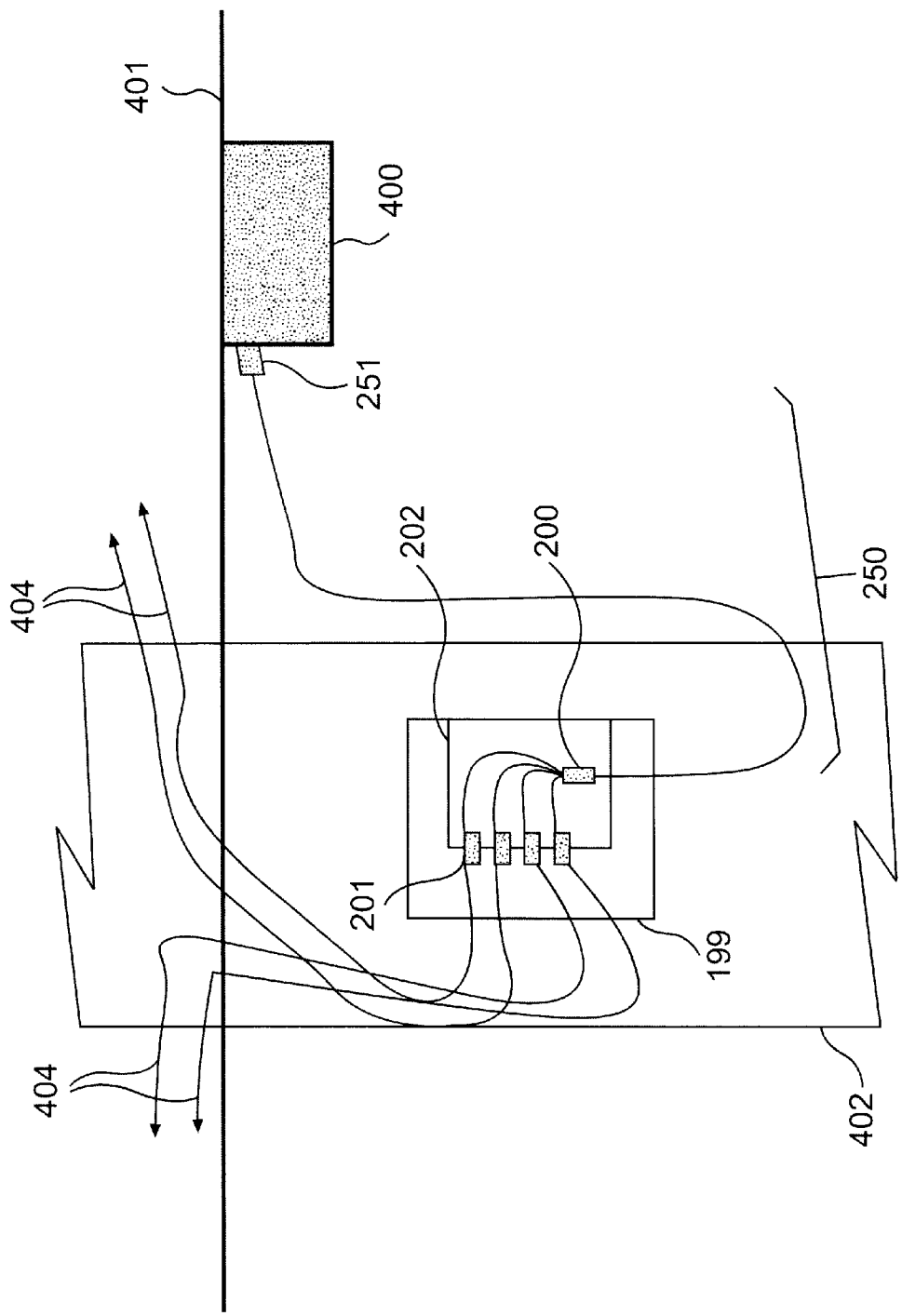
FIG. 4b is a schematic diagram of a pole-mounted splitter-terminal package for an aerial deployment system with a pigtail for the incoming fiber optic strand, according to a representative embodiment.

Aerial deployment systems arrange the splice case, splitter-terminal package, and fiber optic drops in a variety of configurations. Two examples are pole-mounted systems and strand-mounted systems, shown in FIGS. 4a–4b and 5, respectively. FIGS. 4a and 4b illustrate the use of splitter-terminal package 199 in a pole-mounted aerial deployment system. In a pole-mounted system, the splice case is attached to the secondary fiber optic cable, the splitter-terminal package is mounted on the pole, the incoming fiber optic strand runs from the splice case to the splitter-terminal package, and fiber optic drops connected to the outgoing side of the splitter-terminal package run from the pole to the subscriber premises.

Thus, splice case 400 connects to and splices fiber optic cable 401, diverting incoming fiber optic strand 203 to splitter-terminal package 199 mounted on pole 402. As shown in FIG. 4a, incoming fiber optic strand 203 connects to splitter-terminal package 199 through connectorized termination 205. In another embodiment as shown in FIG. 4b, incoming fiber optic strand 203 and connectorized termination 205 are replaced by pigtail 250 as described for FIGS. 2c and 2d above. In this embodiment, connectorized termination 251 plugs directly into splice case 400, as shown in FIG. 4b.

To complete the pole-mounted aerial deployment system, the plurality of fiber optic drops 404 connects to the plurality of outgoing connectorized terminations 201. Each fiber optic drop 404 extends to a subscriber premises.

Figure 5:
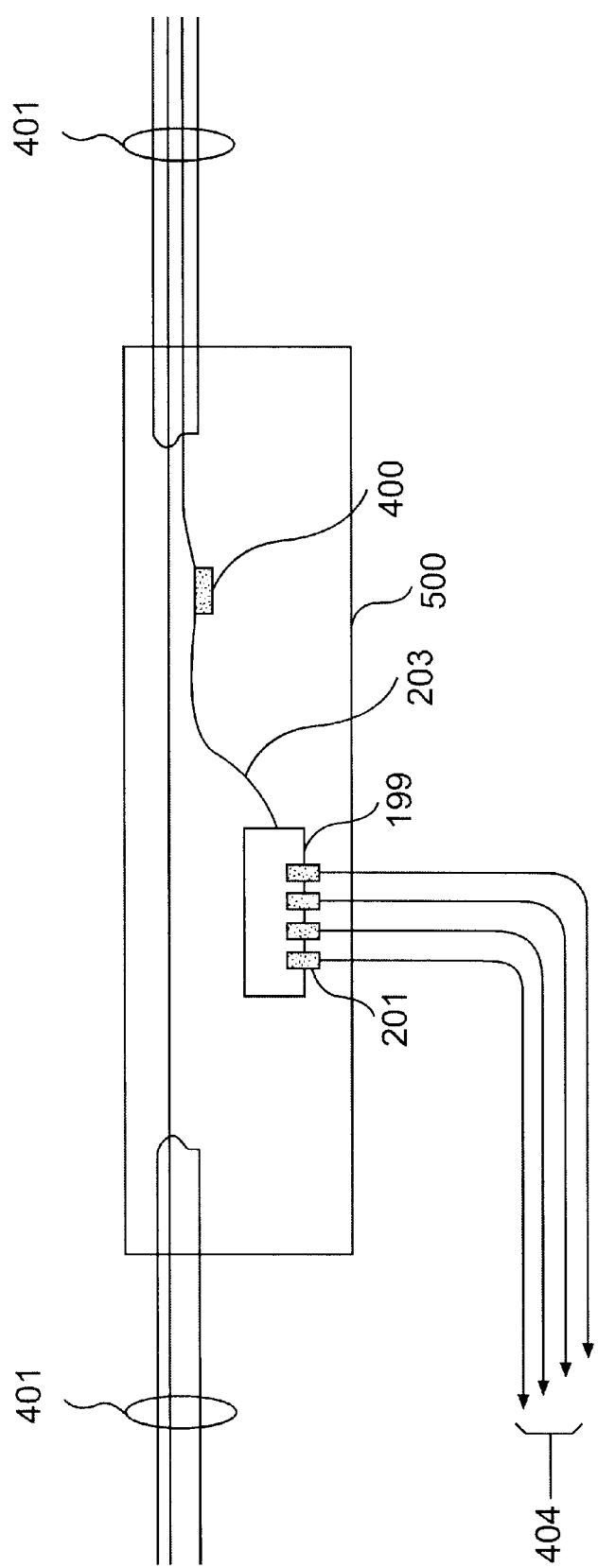
FIG. 5 is a schematic diagram of a strand-mounted splitter-terminal package for an aerial deployment system, according to a representative embodiment.

FIG. 5 illustrates the use of splitter-terminal package 199 in a strand-mounted aerial deployment system. In a strand-mounted system, both the splice case and the splitter-terminal package are mounted inside a splice case housing that is lashed with wire to a secondary fiber optic cable. The splice case splices off the incoming fiber optic strand that runs from the splice case to the splitter-terminal. The fiber optic drops connected to the outgoing side of the splitter-terminal package run from the strand-mounted splice case housing directly to the subscriber premises.

Thus, as shown in FIG. 5, splice case 400 and splitter-terminal package 199 are contained in splice case housing 500. Splice case housing 500 is lashed to fiber optic cable

401 with wire. Splice case 400 connects to and splices fiber optic cable 401, diverting incoming fiber optic strand 203 to the incoming side of splitter-terminal package 199 mounted inside splice case housing 500. On the outgoing side of splitter-terminal package 199, the plurality of connectorized terminations 201 are connected to plurality of fiber optic drops 404.

Figure 6A:
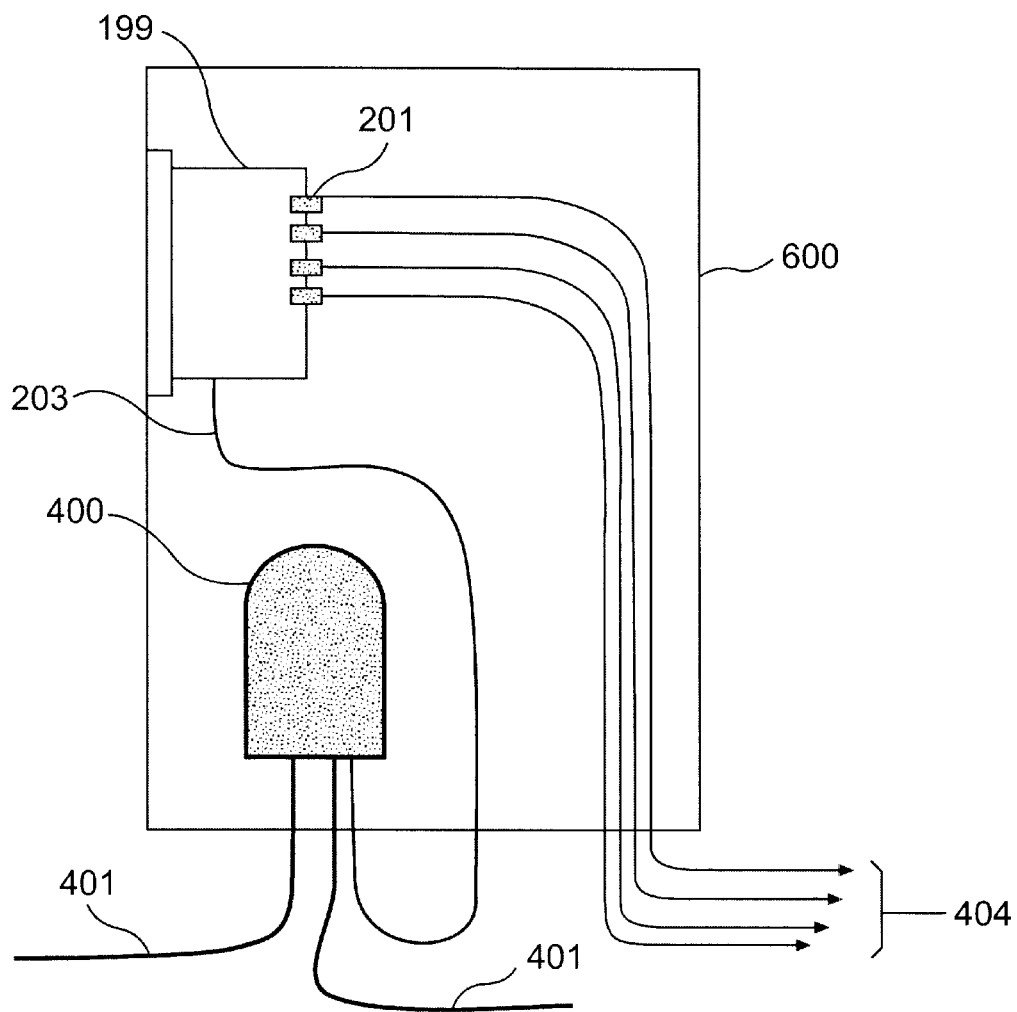
FIG. 6a is a schematic diagram of a pedestal-mounted splitter-terminal package for a buried deployment system with the splice case enclosed in the pedestal shell, according to a representative embodiment.
Figure 6B:
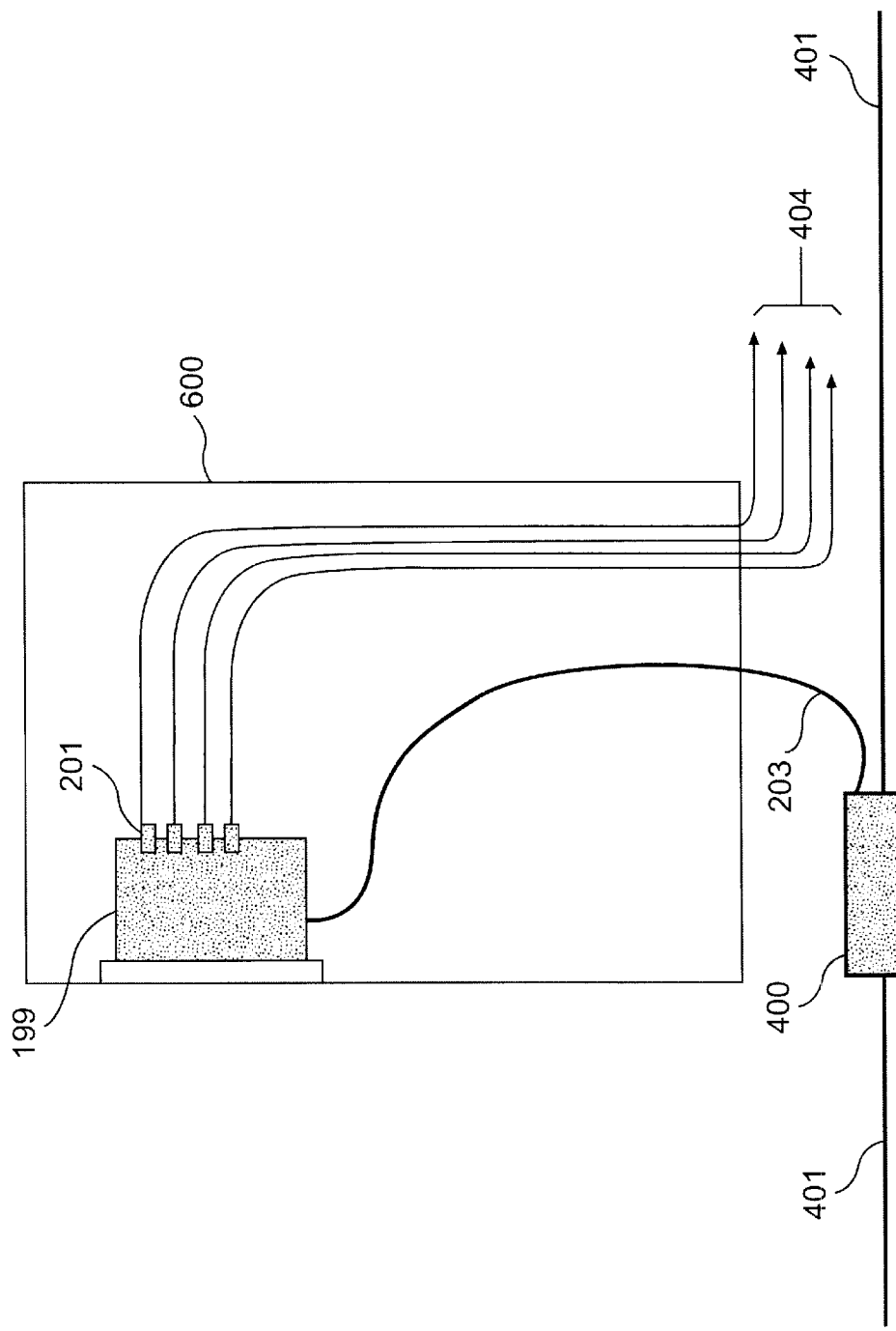
FIG. 6b is a schematic diagram of a pedestal-mounted splitter-terminal package for a buried deployment system with the splice case located separate from the pedestal shell and with the incoming fiber optic cable connected to the splitter-terminal package by a pigtail, according to a representative embodiment.
Figure 6C:
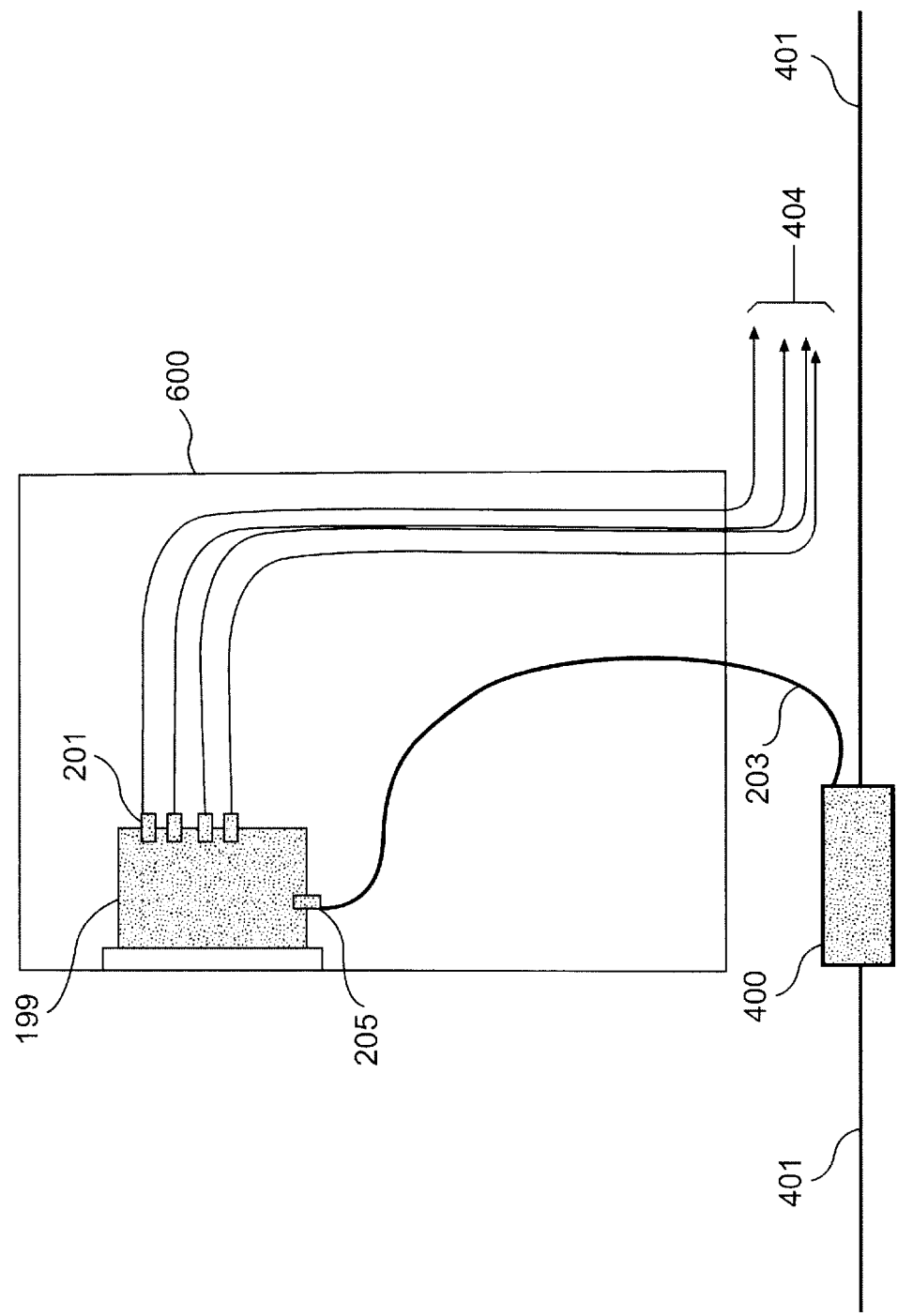
FIG. 6c is a schematic diagram of a pedestal-mounted splitter-terminal package for a buried deployment system with the splice case located separately from the pedestal shell, and with the incoming fiber optic cable connected to the splitter-terminal package with a connectorized termination, according to a representative embodiment.

FIGS. 6a–6c illustrate the use of splitter-terminal package 199 in a pedestal-mounted deployment system for buried lines. Buried deployment systems mount the splitter-terminal package and splice case in a pedestal shell that rests on the ground. As shown in FIG. 6a, a secondary fiber optic cable enters and exits the pedestal shell from the pedestal shell bottom. The splice case connects to the secondary fiber optic cable and splices off an incoming fiber optic strand that runs from the splice case to the splitter-terminal package. The fiber optic drops connected to the outgoing side of the splitter-terminal exit the pedestal through the pedestal shell bottom and proceed underground to the subscriber premises.

In one embodiment, as shown in FIG. 6a, splitter-terminal package 199 and splice case 400 are contained in and mounted on pedestal shell 600. Fiber optic cable 401 enters pedestal shell 600 through the bottom of pedestal 600 and connects to splice case 400. Splice case 400 splices fiber optic cable 401, diverting incoming fiber optic strand 203 to the incoming side of splitter-terminal package 199. On the outgoing side of splitter-terminal package 199, the plurality of connectorized terminations 201 connects to the plurality of fiber optic drops 404. The plurality of fiber optic drops 404 exits pedestal shell 600 through its bottom, and travels underground to subscriber premises.

As shown in FIG. 6b, in another embodiment of the buried deployment system, the splice case resides underground with a secondary fiber optic cable, as opposed to being contained in the pedestal shell. As shown, splice case 400 is positioned underground and not inside pedestal shell 600. Splitter-terminal package 199 is housed in and mounted on pedestal shell 600. Splice case 400 connects to and splices fiber optic cable 401 underground, diverting incoming fiber optic strand 203 to pedestal shell 600. Incoming fiber optic strand 203 enters pedestal shell 600 through its bottom. Once inside pedestal shell 600, incoming fiber optic strand 203 connects to the incoming side of splitter-terminal package 199. On the outgoing side of splitter-terminal package 199, the plurality of connectorized terminations 201 connects to the plurality of fiber optic drops 404. The plurality of fiber optic drops exits pedestal shell 600 through its bottom, and travels underground to subscriber premises.

In either of the configurations of FIGS. 6a and 6b, incoming fiber optic strand 203 connects to splitter-terminal package 199 with connectorized terminations or is replaced with a pigtail having a connectorized termination on its the end.

On the outgoing side of the splitter-terminal package, the outgoing connectorized terminations connect to fiber optic drops. Each fiber optic drop proceeds to a subscriber premises for connecting a subscriber's fiber optic electronic device to fiber optic service. Thus, continuous, uninterrupted fiber optic service is delivered all the way to the subscriber premises serving subscriber electronic devices (e.g., television, telephone, personal computer). This fiber optic network deployment system eliminates the inferior copper drop connections prevalent in the prior art.

In each of the above-described deployment systems, the incoming fiber optic strand running from the splice case to the splitter-terminal package can be connectorized or spliced. The use of either spliced or connectorized terminations for the splice case and incoming side of the splitter-terminal package depends upon the service provider's intended method of installation. If the service provider desires more factory pre-assembly, the incoming fiber optic strand would be spliced to the splice case and splitter-terminal package at the factory and delivered as a pre-connected unit. If field assembly were desired, service providers would manufacture the splice case and incoming side of the splitter-terminal package with connectorized terminations so that the components could be connected in the field. This configuration would also allow customizing of the length of the incoming fiber optic strand to accommodate field requirements.

Connectorized Outside Fiber Drop

A connectorized outside fiber drop provides fiber connectivity between a splitter-terminal and a fiber optic interface device. For example, as shown in FIG. 1b, connectorized outside fiber drop 120 provides communication between splitter-terminal 108 and fiber optic interface device 122. The connectorized ends eliminate the need for fiber splicing and reduce installation and replacement costs.

Figure 7A:
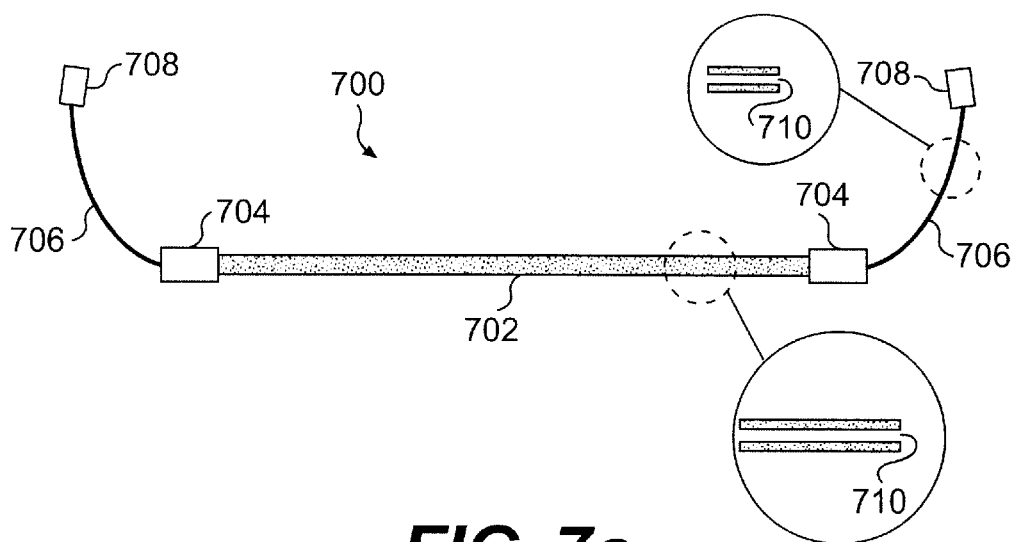
FIG. 7a is a schematic diagram of a connectorized outside fiber drop according to a representative embodiment.

FIG. 7a illustrates a connectorized outside fiber drop 700 according to a representative embodiment. As shown, outside drop 700 includes a section of outside plant sheath 702, transition fittings 704, pigtails 706, fiber optic connectors 708, and a fiber optic strand 710. Outside plant sheath 702 is positioned over a middle section of fiber optic strand 710. The design of drop 700 allows fiber optic strand 710 to float freely within outside plant sheath 702 to prevent stress on fiber optic strand 710 during installation and normal operation.

Outside plant sheath 702 preferably contains no metallic strength members, to avoid bonding and grounding requirements at a subscriber premises. Both ends of outside plant sheath 702 are attached to transition fittings 704. Transition fittings 704 provide a structure with which to secure drop 700 with adequate strain relief. Transition fittings 704 also provide a structure to transition between outside plant sheath 702 and pigtails 706. Pigtails 706 attach to transition fittings 704 and enclose fiber optic strand 710 from transition fittings 704 to the ends of fiber optic strand 710, at which point connectors 708 are attached to fiber optic strand 710 and pigtails 706.

Figure 7B:
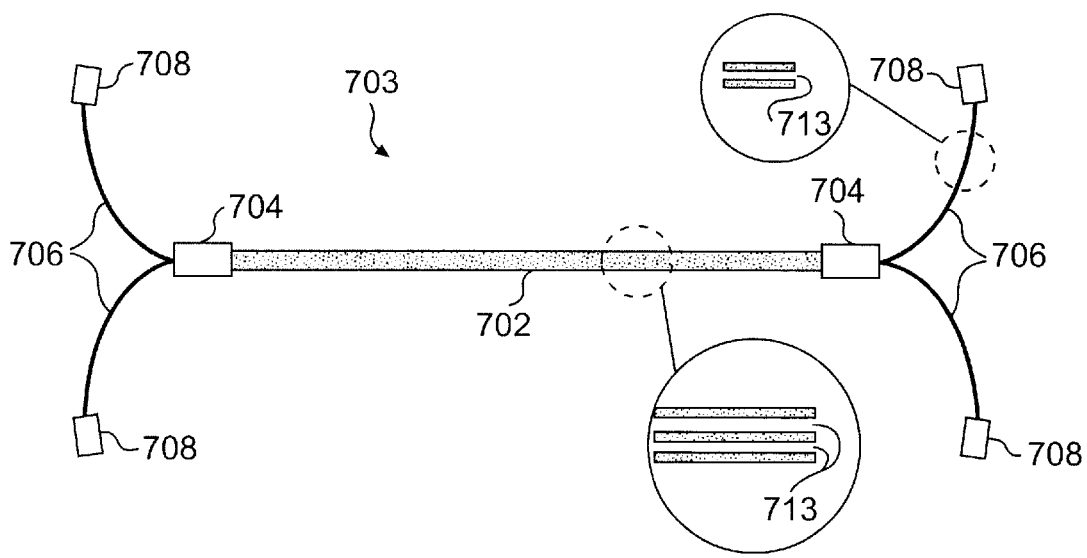
FIG. 7b is a schematic diagram of a connectorized outside fiber drop having two fiber optic strands, according to a representative embodiment.

If the connectorized outside fiber drop contains more than one fiber optic strand, then one set of pigtails with connectors is provided for each fiber optic strand, as FIG. 7b shows for an outside drop 703 having two fiber optic strands 713. With two fiber optic strands 713, outside drop 703 can support two separate lines of communication, e.g., video and data.

Outside plant sheath 702 provides environmental protection for fiber optic strand(s) 710 between a splitter-terminal and a fiber optic interface device. Therefore, sheath 702 must be appropriate for the particular application for which a drop is used, e.g., aerial, buried, or underground installations. For aerial applications, sheath 702 is preferably self-supporting and dielectric, capable of withstanding anticipated stresses such as wind-loading, ice loading, and ultraviolet exposure. As an example, sheath 702 could conform to the requirements of Section 6 of GR-20-CORE, Generic Requirements for Optical Fiber and Optical Fiber Cable, Issue Jul. 2, 1998, with the exception that the rated installation load of cables be 1780 N (400 lbf). Section 6 of GR-20-CORE is hereby incorporated by reference in its entirety. For buried applications, sheath 702 must withstand anticipated stresses and deterioration mechanisms such as water penetration.

Transition fittings 704 are attached to outside plant sheath 702 and pigtails 706 at points proximate to the ends of outside fiber drop 700. Transition fittings 704 provide strain relief for outside fiber drop 700 and for fiber optic strand 710 as it passes from sheath 702 to pigtails 706. Optionally, transition fittings 704 may include gel to further protect fiber optic strand 710. Transition fittings 704 also provide a sturdy structure that can be attached to the housings of splitter-terminal 108 and fiber optic interface device 122. For example, transition fittings 704 could be clamped inside a female fitting that is integral to a housing. Alternatively, transition fittings 704 could be secured to a housing using a cable tie.

Pigtails 706 are jackets that protect individual fiber optic strands 710 inside the housings of splitter-terminal 108 and fiber optic interface device 122. In relation to outside plant sheath 702, pigtails 706 are more flexible, allowing fiber optic strands 710 to bend at a smaller radius. This flexibility enables installers to easily route outside drop 700 to connectors within the housings of splitter-terminal 108 and fiber optic device 122. The flexibility also allows installers to take up any slack in fiber optic strands 710 by coiling strands 710 within a housing. In a representative embodiment, the jacket of pigtails 706 is made of extruded thermal plastic of a thickness of 2.2 mm to 3.0 mm. In addition, when more than one fiber optic strand 710 is contained in the connectorized outside fiber drop 700 (as shown in FIG. 7b), pigtails 706 are color coded to identify the same fiber optic strand on both ends of drop 700.

Connectors 708 are compatible with the connectorized terminations provided in splitter-terminal 108 and fiber optic interface device 122. Depending on the particular application, suitable connectors could include such types as SC, ST, and FC connectors. As an example, connectors 708 could conform to GR-326-CORE, Generic Requirements for Single-Mode Optical Connectors and Jumper Assemblies, Issue Dec. 2, 1996 (with the clarification that connectors 708 meet the reflectance performance of −55 dB for all conditions). GR-326-CORE is hereby incorporated by reference in its entirety.

As a whole, the transmission performance of connectorized outside fiber drop 700 must be consistent with the requirements of the fiber optic network system in which it operates. For example, the single-mode fiber attenuation coefficient of outside drop 700 should be less than 0.4 dB/km between 1270 nm and 1350 nm, and 0.3 dB/km between 1500 nm and 1600 nm. The attenuation should be uniformly distributed throughout the length of outside drop 700 such that there are no discontinuities greater than 0.1 dB for single-mode fiber at any design wavelength. In addition, all fibers in outside drop 700 should not exhibit point discontinuities with a measured loss greater than 0.10 dB or a reflectance greater than −45 dB at 1310 nm or 1650 nm.

Connectorized outside fiber drop 700 must also meet the structural and material specifications of the fiber optic network system in which it operates. For example, outside drop 700 should meet all appropriate requirements of the National Electrical Code (NEC), e.g., NEC NFPA 70. In addition, outside drop 700 should meet the flammability requirements of UL-1581 when tested in accordance with the VW-1 Vertical Wire Flame Test—All Wires Flame Test procedure.

The overall length of connectorized outside fiber drop 700 depends upon the typical lengths between splitter-terminals and subscriber premises in a particular fiber optic network system. Outside drop 700 is designed to be manufactured in predetermined lengths that accommodate these typical network configurations. In this manner, an installer first estimates the distance between a particular splitter-terminal and the particular location at which the fiber optic interface device will be mounted on the subscriber premises. The installer then selects a fiber optic drop of an appropriate predetermined length.

Pigtails 706 provide mechanical protection for the fiber optic strand during installation and normal operation. Pigtails 706 also provide a means for accommodating variations in the distance between a strain relief point (where the transition fitting is secured) and an adapter within a splitter-terminal or fiber optic interface device. As such, the length of pigtails 706 depends upon the design of the splitter-terminal and fiber optic interface device. As a minimum, a pigtail must be long enough to reach the adapter in a splitter-terminal or a fiber optic interface device, while maintaining at least the minimum allowable bend radius of the fiber optic strand. However, pigtails 706 must not be so long that the routing hardware of a splitter-terminal or fiber optic interface device (discussed below) is unable to manage the slack. Thus, in light of these guidelines, a suitable length for pigtails 706 could range from, for example, 18 to 36 inches for a typical installation.

Fiber Optic Interface Device (FID)

As shown in FIG. 1b, fiber optic interface device 122 provides an interface point between connectorized outside fiber optic drop 120 and connectorized inside fiber drop 124. As this interface, FID 122 receives one or more fiber optic strands from drop 120, manages the slack of the fiber optic strand(s), protects the strand(s) from the outside environment, and connects the strand(s) to connectorized inside fiber drop 124. In doing so, FID 122 provides a clear demarcation point between network-operator-owned materials and customer-owned materials, provides a convenient fiber optic test point outside of the customer's home, and allows for the efficient installation, maintenance, and replacement of outside drop 120, all without affecting the customer's line configuration within the home.

Figure 8A:
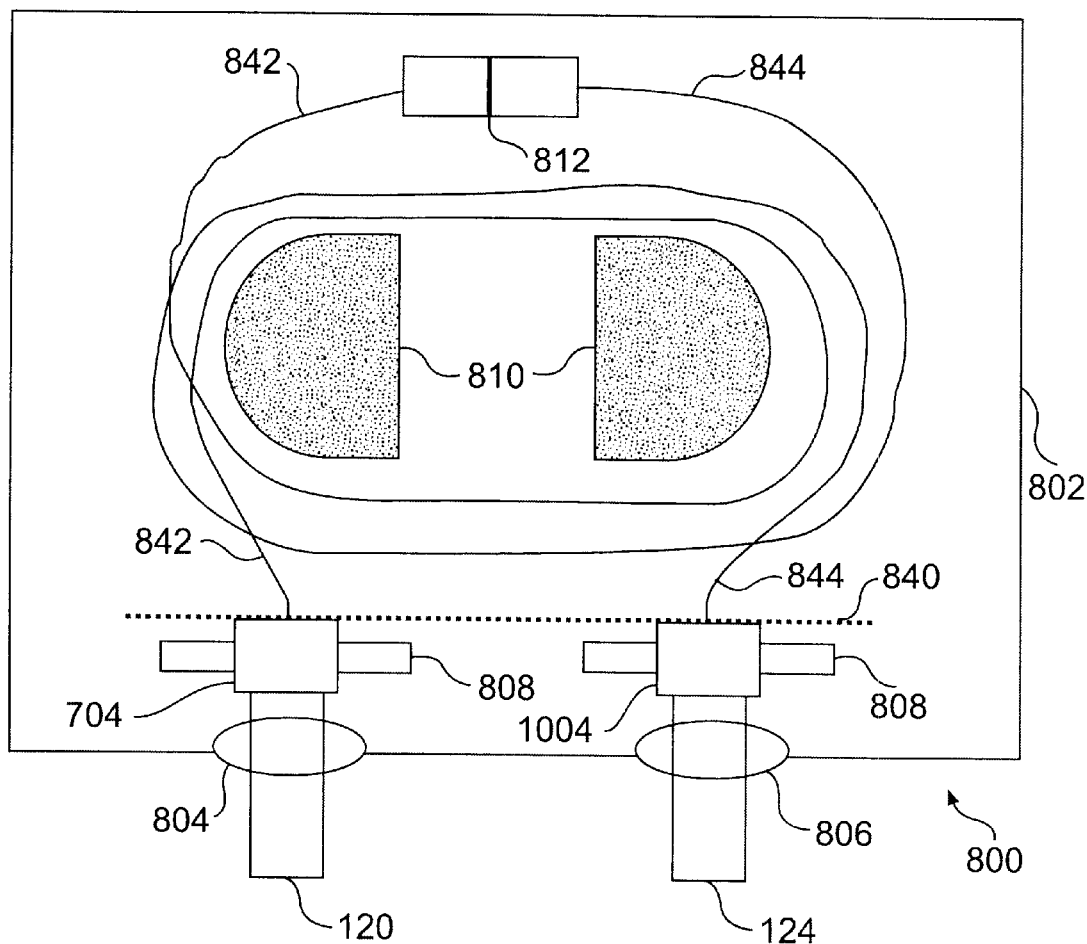
FIG. 8a is a schematic diagram of a fiber optic interface device, according to a representative embodiment of the present invention.

FIG. 8a illustrates a fiber optic interface device 800 according to a representative embodiment. As shown, FID 800 includes a housing 802 having ports 804 and 806, termination hardware 808, routing hardware 810, and one or more adapters 812.

Figure 8B:
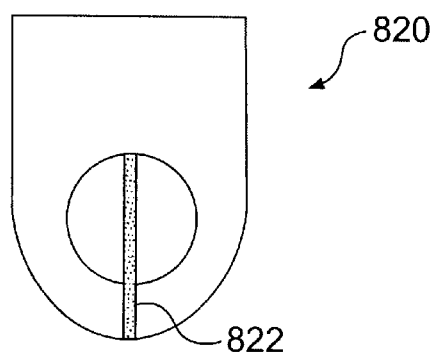
FIG. 8b is a schematic diagram of a grommet for a fiber optic interface device, according to a representative embodiment of the present invention.

Housing 802 of FID 800 protects the interior components against environmental damage, and can be constructed of metal, hardened plastic, or any other material suitable for the intended application. Housing 802 is adapted to be mounted on the side of a customer's house and is preferably capable of withstanding temperatures ranging from −40 degrees Celsius to 85 degrees Celsius. For convenient and secured access to the internal components, housing 802 preferably includes a swinging, lockable door. In addition, housing 802 is sealed to prevent wind driven rain from affecting the internal components. As a part of this seal, ports 804 and 806 of housing 800 preferably include grommets that prevent infiltration from such hazards as water and insects. FIG. 8b illustrates a representative embodiment of a grommet 820 in which a slit 822 is cut to receive outside drop 120 or inside drop 124. The remaining portion of grommet 820 is solid and impervious. As an example, grommet 820 could be made of a flexible rubber or a plastic elastomer.

As shown in FIG. 8a, port 804 is adapted to receive connectorized outside fiber drop 120. Similarly, port 806 is adapted to receive connectorized inside fiber drop 124. The outside plant sheaths of outside drop 120 and inside drop 124 slide through ports 804 and 806 to enter FID 800. From ports 804 and 806, outside drop 120 and inside drop 124 extend into housing 802, with transition fittings positioned just above ports 804 and 806. Termination hardware 808 secures the transition fittings of outside drop 120 and inside drop 124 to housing 802.

Figure 8C:
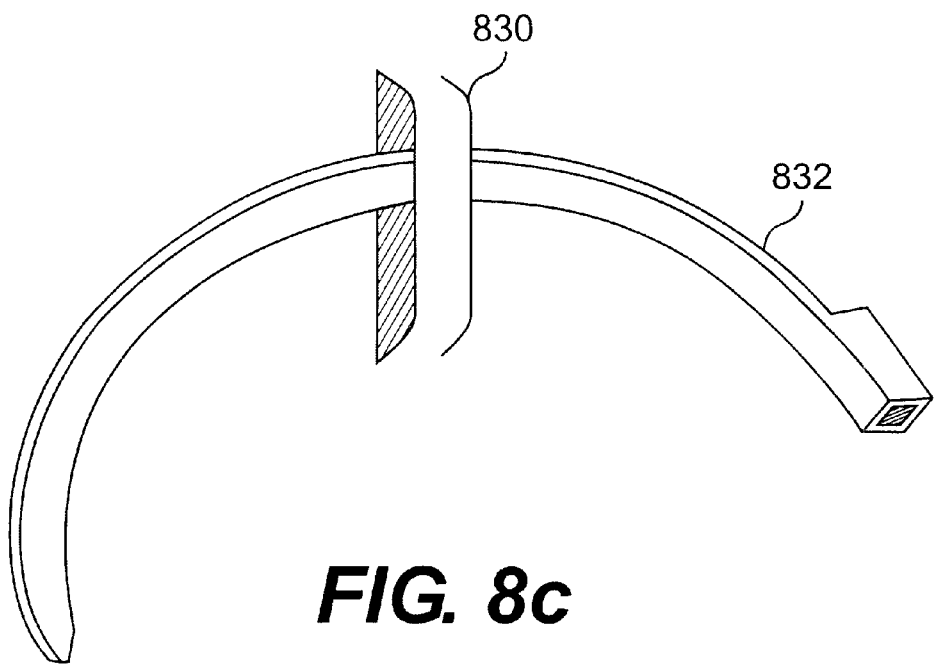
FIGS. 8c and 8d are schematic diagrams of termination hardware in a fiber optic interface device, according to representative embodiments of the present invention.
Figure 8D:
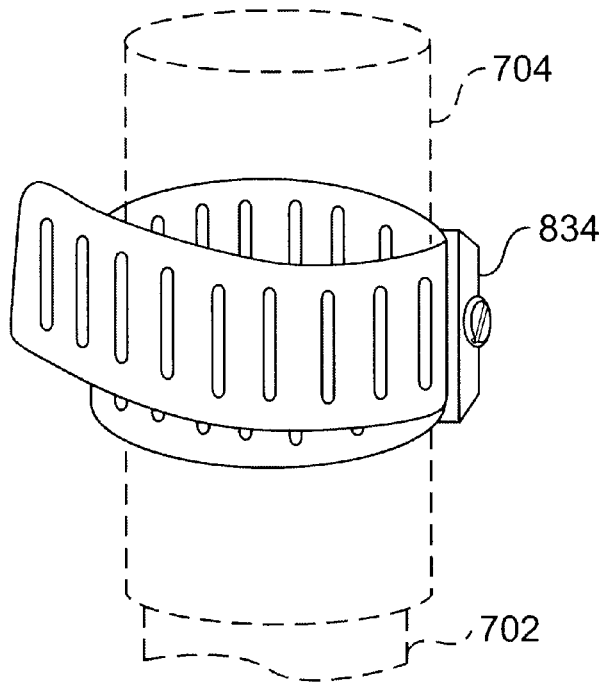

Termination hardware 808 is positioned above ports 804 and 806 to secure outside drop 120 and inside drop 124, and to provide necessary strain relief. To reduce labor costs, termination hardware 808 is easily installed, removed, and replaced. For example, as shown in FIG. 8c, suitable termination hardware 808 could include a raised slot 830 in the back of housing 802, through which a cable tie 832 is placed. Cable tie 832 wraps around and secures the transition fitting of outside drop 120 or inside drop 124 (transition fittings 704 and 1004, respectively). Alternatively, as shown in FIG. 8d, termination hardware 808 could be a hose clamp 834 attached to housing 802 through which the transition fitting 704 or 1004 of outside drop 120 or inside drop 124, respectively, is placed and secured. (Although FIG. 8a shows termination hardware 808 in the context of FID 800, termination hardware 808 could be used in a splitter-terminal or optical network terminal as well.)

As shown in FIG. 8a, routing hardware 810 routes the pigtails of outside drop 120 and inside drop 124 to adapter 812. Routing hardware 810 stores any extra length in the pigtails and is shaped to keep the fiber optic strands within a proper bend radius. In storing slack, routing hardware 810 enables an installer to adjust the length of a drop without removing the connectors and without splicing. Conventional copper network interface devices lack this unique routing hardware. A pigtail with slack wraps around routing hardware 810 until all the slack is taken up and the remaining portion of pigtail is long enough to reach adapter 812. Although shown as separate semicircles in FIG. 8a, routing hardware 810 could be any shape or shapes that satisfy the above-described functions, e.g., a continuous circle or oval would also perform well. (Although FIG. 8a shows routing hardware 810 in the context of FID 800, routing hardware 810 could be used in a splitter-terminal or optical network terminal as well.) As another alternative for managing slack storage routing hardware 810 could be plastic routing clips evenly spaced in a pattern (e.g., a circular pattern) within FID 800.

As shown in FIG. 8a, FID 800 also includes at least one fiber optic connector adapter 812, which is a connectorized termination that connects the connector of outside drop 120 to the connector of inside drop 124, providing a well-aligned and stable fiber optic connection. As such, one connector adapter 812 is required for each fiber optic strand 710 of connectorized outside fiber drop 700 (see FIGS. 7a and 7b). Adapter 812 is any fitting suitable for coupling connector 708 of outside drop 700 to the connector of inside drop 124 (described below). For example, adapter 812 can accommodate an SC-, ST-, or FC-type connector, and can be for single or multiple devices. Although shown horizontally mounted in FIG. 8a, adapter 812 can also be oriented vertically or at any other angle, depending on the construction of connectorized outside fiber drop 120 and connectorized inside fiber drop 124. As with connectorized terminations, adapter 812 provides a convenient interface point that eliminates the need for splicing.

Housing 802 of FID 800 also includes means for securely attaching FID 800 to a subscriber premises. For example, housing 802 could include external tabs containing holes through which a fastener such as a screw could be placed. Housing 802 could also include internal slots or knockouts that can receive fasteners that attach FID 800 to a subscriber premises.

Figure 9:
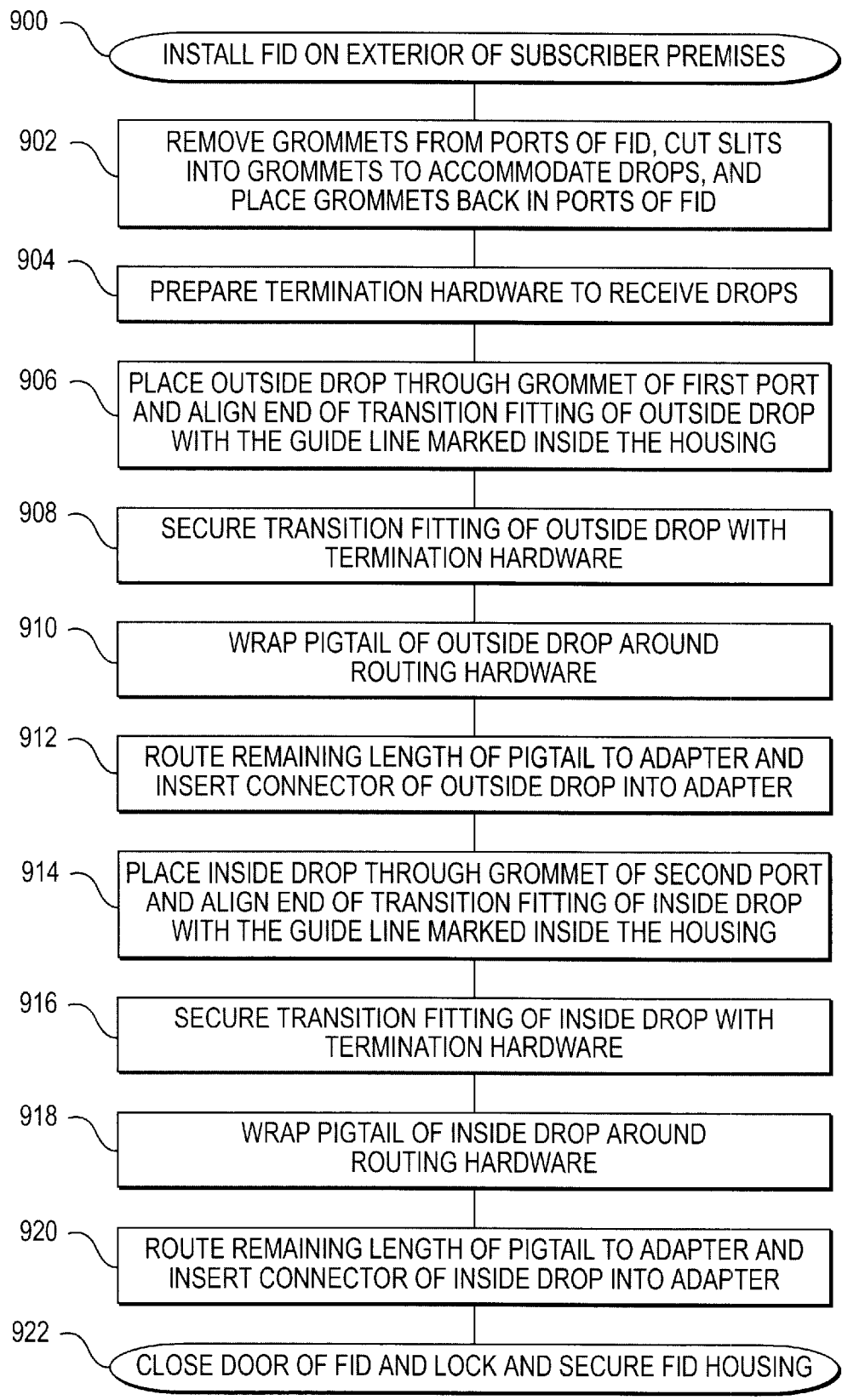
FIG. 9 is a flowchart outlining how a fiber optic interface device is installed and how the pigtails of an outside fiber drop and an inside fiber drop are installed in the fiber optic interface device, according to a representative embodiment of the present invention.

In light of the functions of each component of FID 800, the flowchart of FIG. 9 illustrates how FID 800 is installed and how the pigtails of outside drop 120 and inside drop 124 are installed in FID 800, according to a representative embodiment. Although the flowchart describes a single fiber optic strand routed through a fiber optic interface device, as one skilled in the art would appreciate, the flowchart applies to the routing of multiple fiber optic strands as well, in which case more than one fiber optic strand wraps around the routing hardware in each direction, and more than one adapter couples the fiber optic strands together. In addition, the flowchart also applies to slack management within a splitter-terminal or optical network terminal.

In step 900, the field technician installs FID 800 at a suitable location on a building exterior, using, for example, external mounting feet of FID 800 and appropriate fasteners. The suitable location is preferably accessible by an installer or repair person without a ladder and without being obstructed by parts of the building or objects around the building. Appropriate fasteners are compatible with the external mounting feet of FID 800 and the building structure to which FID 800 is to be affixed.

Once FID 800 is mounted, in step 902, the technician removes the grommets from ports 804 and 806, cuts a slit into each grommet to accommodate outside drop 120 and inside drop 124, respectively, and places the grommets back into ports 804 and 806. As described above, FIG. 8b illustrates a representative grommet 820 and slit 822.

In step 904, the technician prepares termination hardware 808 to receive outside drop 120 and inside drop 124. For example, in the case of a raised slot 830 (FIG. 8c), the technician inserts one or more cable ties 832 through raised slot 830. In the case of a hose clamp 834 (FIG. 8d), the technician loosens hose clamp 834 to a size larger than the diameters of outside drop 120 and inside drop 124.

In step 906, the technician places outside drop 120 through the grommet in port 804 and aligns the end of the transition fitting of outside drop 120 with a guide line 840 marked on the inside of housing 802. Guide line 840 ensures that the technician secures connectorized outside fiber drop 120 at its transition fitting, where it is most sturdy and provides the optimal strain relief.

Once aligned properly, in step 908, the technician secures the transition fitting of outside drop 120 with termination hardware 808. For example, with raised slot 830, the technician tightens cable tie(s) 832 around outside drop 120 and trims off any excess of cable tie(s) 832. As another example, with hose clamp 834, the technician places outside drop 120 inside hose clamp 834, tightens the worm gear, and secures the hose clamp around outside drop 120.

In step 910, the technician wraps pigtail 842 of outside drop 120 around routing hardware 810 to store the slack of pigtail 842 at a proper bending radius. The technician stores enough slack such that the remaining length of pigtail 842 reaches only to adapter 812. To maintain a proper bending radius between termination hardware 808 and routing hardware 810, FIG. 8a shows pigtail 842 wrapping around routing hardware 810 in a clockwise direction. However, pigtail 842 could wrap in any direction, provided the relative distance between and configuration of termination hardware 808 and routing hardware 810 does not create an unacceptable bend.

After storing the slack of pigtail 842 around routing hardware 810, in step 912, the technician routes the remaining length of pigtail 842 to adapter 812 and inserts the connector of outside drop 120 into adapter 812.

In step 914, the technician places inside drop 124 through the grommet in port 806 and aligns the end of the transition fitting of inside drop 124 with guide line 840. As with outside drop 120, guide line 840 ensures that the technician secures inside drop 124 at its transition fitting, where it is most sturdy and provides the optimal strain relief.

Once aligned properly, in step 916, the technician secures inside drop 124 with termination hardware 808, as described above for outside drop 120 in step 908.

In step 918, the technician wraps pigtail 844 of inside drop 124 around routing hardware 810 to store the slack of pigtail 844 at a proper bending radius. The technician stores enough slack such that the remaining length of pigtail 844 reaches only to adapter 812. To maintain a proper bending radius between termination hardware 808 and routing hardware 810, FIG. 8*a* shows pigtail 844 wrapping around routing hardware 810 in a counterclockwise direction. However, pigtail 844 could wrap in any direction, provided the relative distance between and configuration of termination hardware 808 and routing hardware 810 does not create an unacceptable bend.

After storing the slack of pigtail 844 around routing hardware 810, in step 920, the technician routes the remaining length of pigtail 844 to adapter 812 and inserts the connector of inside drop 124 into adapter 812.

Finally, in step 922, the technician closes the door of FID 800 and locks and secures housing 802.

As a component of a fiber optic network system, FID 800 serves at least four beneficial functions. First, FID 800 provides an interface point between outside drop 120 and inside drop 124. This interface point transitions between the different physical properties of outside drop 120 and inside drop 124. Specifically, because outside drop 120 is exposed to exterior elements in either buried or aerial application, outside drop 120 has a heavy and inflexible sheath. In contrast, being installed inside a building, inside drop 124 is lighter and more flexible. Thus, FID 800 transitions the considerably different constructions of outside drop 120 and inside drop 124.

A second function of FID 800 is to provide a convenient test point for verifying service and diagnosing service problems. Because FID 800 is mounted outside of a building, a technician can access the testing point without disturbing the customer. Thus, for example, if a customer reports a service problem, a technician can visit the customer's house during the day, without requiring the customer to provide access to the house. The technician can test optical levels at FID 800 and thereby determine if the problem originates from within the network or within the customer's house (e.g., with a defective optical network terminal).

FID 800 also provides a clear demarcation point between the material and equipment owned by the fiber optic service provider and the material and equipment owned by the customer. Once FTTH systems are implemented on a large scale, service providers will likely favor customers' taking ownership of the connectorized inside fiber drops and fiber optic electronic devices. Thus, having the FID as a demarcation point will clarify who is responsible for repairs and maintenance.

Finally, FID 800 provides a flexible maintenance point. If an outside fiber drop or an inside fiber drop is defective or suffers damages (e.g., from a falling tree or from errant excavations or interior demolition), a technician can simply disconnect the inoperable drop and can replace it with another connectorized drop without requiring any splicing. In addition, if the outside drop suffers damage, the technician can replace the drop without requiring customer access and without requiring any modification or rerouting of the facilities located within the subscriber premises, which is often a time-consuming and difficult operation.

Connectorized Inside Fiber Drop

A connectorized inside fiber drop provides fiber connectivity between a fiber optic interface device and an optical network terminal. For example, as shown in FIG. 1*b*, connectorized inside fiber drop 124 provides communication between fiber optic interface device 122 and optical network terminal 126. The connectorized ends eliminate the need for fiber splicing and reduce installation and replacement costs.

Figure 10A:
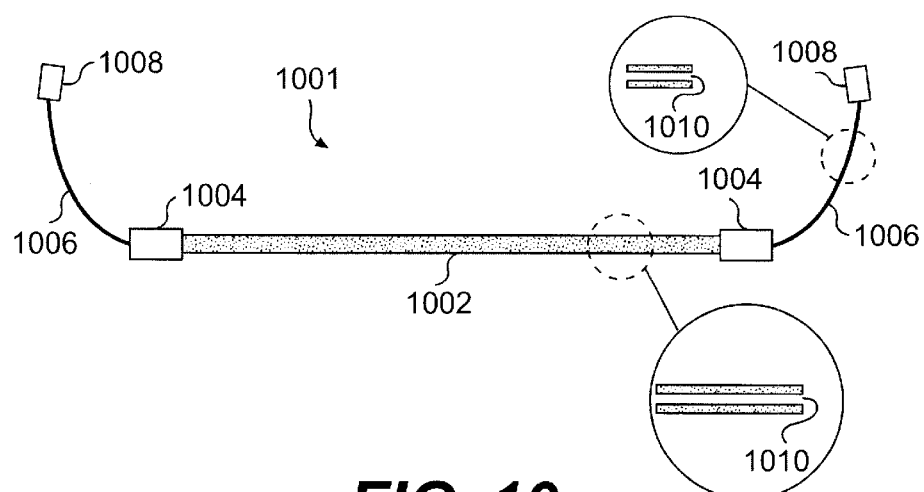
FIG. 10a is a schematic diagram of a connectorized inside fiber drop according to a representative embodiment.

FIG. 10*a* illustrates a connectorized inside fiber drop 1001 according to a representative embodiment. As shown, inside drop 1001 includes a section of sheath 1002, transition fittings 1004, pigtails 1006, fiber optic connectors 1008, and a fiber optic strand 1010. Sheath 1002 is positioned over a middle section of fiber optic strand 1010. The design of drop 1001 allows fiber optic strand 1010 to float freely within sheath 1002 to prevent stress on fiber optic strand 1010 during installation and normal operation.

Sheath 1002 preferably contains no metallic strength members, to avoid bonding and grounding requirements at a subscriber premises. Both ends of sheath 1002 are attached to transition fittings 1004. Transition fittings 1004 provide a structure with which to secure drop 1001 with adequate strain relief Transition fittings 1004 also provide a structure to transition between sheath 1002 and pigtails 1006. Pigtails 1006 attach to transition fittings 1004 and enclose fiber optic strand 1010 from transition fittings 1004 to the ends of fiber optic strand 1010, at which point connectors 1008 are attached to fiber optic strand 1010 and pigtails 1006.

Figure 10B:
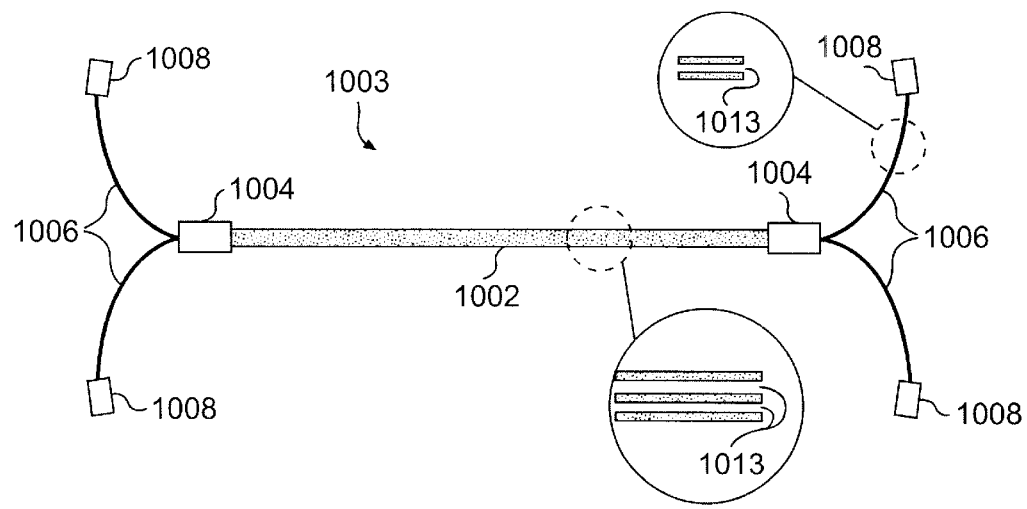
FIG. 10b is a schematic diagram of a connectorized inside fiber drop having two fiber optic strands, according to a representative embodiment.

If a connectorized inside fiber drop contains more than one fiber optic strand, then one set of pigtails with connectors is provided for each fiber optic strand, as FIG. 10*b* shows for an inside drop 1003 having two fiber optic strands 1013. With two fiber optic strands 1013, inside drop 1003 can support two separate lines of communication, e.g., video and data. In addition, the separate fiber optic strands 1013 can be run to separate optical network terminals. Sheath 1002 provides environmental protection for fiber optic strand(s) 1010 between a fiber optic interface device and an optical network terminal. Therefore, sheath 1002 must be appropriate for the particular application for which inside drop 1001 is used, e.g., inside-wall, conduit, or plenum installations. As opposed to an outside fiber optic drop, inside drop 1001 is installed indoors and is subject to fewer environmental hazards. Therefore, sheath 1002 is thinner and more flexible than an outside plant sheath of an outside fiber drop. The flexibility of sheath 1002 also enables installers to run inside-drop 1001 at smaller bending radii to accommodate the tighter confines of interior installations. As an example of a suitable construction, sheath 1002 could conform to the requirements of GR-409-CORE, Generic Requirements for Premise Fiber Optical Cable, Issue May 1, 1994. GR-409-CORE is hereby incorporated by reference in its entirety.

For an inside fiber drop 1001 having one fiber optic strand 1010, sheath 1002 is preferably fastened to the housings of the fiber optic interface device and the optical network terminal. The fiber optic strand 1010 then extends into the housings. For an inside fiber drop 1003 having more than one fiber optic strand 1013, sheath 1002 is preferably fastened to the housing of the fiber optic interface device and to a location near the optical network terminals that the multiple fiber optic strands 1013 serve. In this manner, the individual fiber optic strands 1013 can be routed separately to the appropriate optical network terminals.

Transition fittings 1004 are attached to outside plant sheath 1002 and pigtails 1006 at points proximate to the ends of inside fiber drop 1001. Transition fittings 1004 provide strain relief for inside fiber drop 1001 and for fiber optic strand 1010 as it passes from sheath 1002 to pigtails 1006. Optionally, transition fittings 1004 may include gel to further protect fiber optic strand 1010. Transition fittings 1004 also provide a sturdy structure that can be attached to the housings of fiber optic interface device 122 and optical network terminal 126. For example, transition fittings 1004 could be clamped inside a female fitting that is integral to a housing. Or, transition fittings 1004 could be secured to a housing using a cable tie.

Pigtails 1006 are jackets that protect individual fiber optic strands 1010 inside the housings of fiber optic interface device 122 and optical network terminal 126. In relation to sheath 1002, pigtails 1006 are more flexible, allowing fiber optic strands 1010 to bend at a smaller radius. This flexibility enables installers to easily route inside drop 1001 to connectors within the housings of fiber optic device 122 and optical network terminal 126. The flexibility also allows installers to take up any slack in fiber optic strands 1010 by coiling strands 1010 within a housing. In a representative embodiment, the jacket of pigtails 1006 is made of extruded thermal plastic of a thickness of 2.2 mm to 3.0 mm. In addition, when more than one fiber optic strand 1010 is contained in the connectorized inside fiber drop 1003 (as shown in FIG. 10b), pigtails 1006 are color coded to identify the same fiber optic strand on both ends of inside drop 1003.

Connectors 1008 are compatible with the connectorized terminations provided in fiber optic interface device 122 and optical network terminal 126. Depending on the particular application, suitable types of connectors 1008 could include such types as SC, ST, and FC connectors. As an example, connectors 1008 could conform to GR-326-CORE, Generic Requirements for Single-Mode Optical Connectors and Jumper Assemblies, Issue Dec. 2, 1996 (with the clarification that connectors 1008 meet the reflectance performance of −55 dB for all conditions).

As a whole, the transmission performance of connectorized inside fiber drop 1001 must be consistent with the requirements of the fiber optic network system in which it operates. For example, the single-mode fiber attenuation coefficient of inside drop 1001 should be less than 0.4 dB/km between 1270 nm and 1350 nm, and 0.3 dB/km between 1500 nm and 1600 nm. The attenuation should be uniformly distributed throughout the length of inside drop 1001 such that there are no discontinuities greater than 0.1 dB for single-mode fiber at any design wavelength. In addition, all fibers in inside drop 1001 should not exhibit point discontinuities with a measured loss greater than 0.10 dB or a reflectance greater than −45 dB at 1310 nm or 1550 nm.

Connectorized inside fiber drop 1001 must also meet the structural and material specifications of the fiber optic network system in which it operates. For example, inside drop 1001 should meet all appropriate requirements of the National Electrical Code (NEC), e.g., NEC NFPA 70. In addition, inside drop 1001 should meet the flammability requirements of UL-1581 when tested in accordance with the VW-1 Vertical Wire Flame Test—All Wires Flame Test procedure.

The overall length of connectorized inside fiber drop 1001 depends upon the typical lengths between fiber optic interface devices and optical network terminals in a typical subscriber premises. Inside drop 1001 is designed to be manufactured in predetermined lengths that accommodate these typical subscriber premises configurations. For example, a typical installation may involve an inside fiber drop penetrating an exterior wall of the subscriber premises and entering an inside basement wall where the optical network terminal is mounted. In this manner, an installer first estimates the distance between a particular fiber optic interface device and the particular location at which the optical network terminal will be mounted inside the subscriber premises. The installer then selects an inside fiber drop of an appropriate predetermined length.

Pigtails 1006 provide mechanical protection for the fiber optic strand during installation and normal operation. Pigtails 1006 also provide a means for accommodating variations in the distance between a strain relief point (where the transition fitting is secured) and an adapter within a fiber optic interface device or an optical network terminal. As such, the length of pigtails 1006 depends upon the design of the fiber optic interface device and the optical network terminal. As a minimum, a pigtail must be long enough to reach the adapter in a fiber optic interface device or optical network terminal, while maintaining at least the minimum allowable bend radius of the fiber optic strand. However, pigtails 1006 must not be so long that the routing hardware of a fiber optic interface device or optical network terminal is unable to manage the slack. Thus, in light of these guidelines, a suitable length for pigtails 1006 could range from, for example, 18 to 36 inches for a typical installation.

For each of the above-described FTTH system components, connectorized terminations provide an easy, economical way to connect and disconnect fiber optic drops and inside drops without the necessity of performing fiber optic cable splicing operations. This advantage affords service providers with greater flexibility in accommodating changes and additions to existing fiber optic networks. For example, connectorized terminations easily accommodate new subscribers, as is often the case in a new housing development. Similarly, in the event that an outside fiber drop to the subscriber is damaged, for example, the service provider can abandon the existing drop and opt for the more cost-effective repair of installing a new fiber optic drop from the fiber optic splitter-terminal to the fiber optic interface device.

At all locations where fiber optic strands penetrate housings, cases, or shells, strain relief orifices or fittings well known in the art could be installed to reduce the possibility of damaging the fiber optic strands. Other devices well known in the art, e.g., splice trays, could also be incorporated into the fiber optic deployment systems to provide strain relief and sheath management.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A fiber optic interface device comprising:
   (a) a housing having a first port that receives a connectorized outside fiber optic drop and a second port that receives a connectorized inside fiber optic drop;
   (b) termination hardware attached to the housing proximate to the first port and the second port, wherein the termination hardware secures the connectorized outside fiber optic drop and the connectorized inside fiber optic drop to the housing;
   (c) routing hardware attached to the housing proximate to the termination hardware, wherein the routing hardware receives the connectorized outside fiber optic drop and the connectorized inside fiber optic drop from the termination hardware, stores slack of the connectorized outside fiber optic drop and the connectorized inside fiber optic drop, and routes the connectorized outside fiber optic drop and the connectorized inside fiber optic drop; and
   (d) one or more adapters attached to the housing proximate to the routing hardware, wherein the one or more adapters receive the connectorized outside fiber optic drop and the connectorized inside fiber optic drop from the routing hardware, and provide communication between the connectorized outside fiber optic drop and the connectorized inside fiber optic drop,
      wherein the first port and the second port each include a grommet for preventing infiltration of environmental hazards.

2. The fiber optic interface device of claim 1, wherein the grommet includes a slit through which to receive a fiber optic drop.

3. A fiber optic interface device comprising:
   (a) a housing having a first port that receives a connectorized outside fiber optic drop and a second port that receives a connectorized inside fiber optic drop;
   (b) termination hardware attached to the housing proximate to the first port and the second port, wherein the termination hardware secures the connectorized outside fiber optic drop and the connectorized inside fiber optic drop to the housing;
   (c) routing hardware attached to the housing proximate to the termination hardware, wherein the routing hardware receives the connectorized outside fiber optic drop and the connectorized inside fiber optic drop from the termination hardware, stores slack of the connectorized outside fiber optic drop and the connectorized inside fiber optic drop, and routes the connectorized outside fiber optic drop and the connectorized inside fiber optic drop; and
   (d) one or more adapters attached to the housing proximate to the routing hardware, wherein the one or more adapters receive the connectorized outside fiber optic drop and the connectorized inside fiber optic drop from the routing hardware, and provide communication between the connectorized outside fiber optic drop and the connectorized inside fiber optic drop,
      wherein the termination hardware secures transition fittings of the connectorized outside fiber optic drop and the connectorized inside fiber optic drop.

4. The fiber optic interface device of claim 3, further comprising a line on the housing proximate to the termination hardware, wherein the line indicates proper placement of the transition fittings.

5. A fiber optic interface device comprising:
   (a) a housing having a first port that receives a connectorized outside fiber optic drop and a second port that receives a connectorized inside fiber optic drop;
   (b) termination hardware attached to the housing proximate to the first port and the second port, wherein the termination hardware secures the connectorized outside fiber optic drop and the connectorized inside fiber optic drop to the housing;
   (c) routing hardware attached to the housing proximate to the termination hardware, wherein the routing hardware receives the connectorized outside fiber optic drop and the connectorized inside fiber optic drop from the termination hardware, stores slack of the connectorized outside fiber optic drop and the connectorized inside fiber optic drop, and routes the connectorized outside fiber optic drop and the connectorized inside fiber optic drop; and
   (d) one or more adapters attached to the housing proximate to the routing hardware, wherein the one or more adapters receive the connectorized outside fiber optic drop and the connectorized inside fiber optic drop from the routing hardware, and provide communication between the connectorized outside fiber optic drop and the connectorized inside fiber optic drop,
      wherein the termination hardware comprises a raised slot through which a cable tie is placed.

6. A fiber optic interface device comprising:
   (a) a housing having a first port that receives a connectorized outside fiber optic drop and a second port that receives a connectorized inside fiber optic drop;
   (b) termination hardware attached to the housing proximate to the first port and the second port, wherein the termination hardware secures the connectorized outside fiber optic drop and the connectorized inside fiber optic drop to the housing;
   (c) routing hardware attached to the housing proximate to the termination hardware, wherein the routing hardware receives the connectorized outside fiber optic drop and the connectorized inside fiber optic drop from the termination hardware, stores slack of the connectorized outside fiber optic drop and the connectorized inside fiber optic drop, and routes the connectorized outside fiber optic drop and the connectorized inside fiber optic drop; and
   (d) one or more adapters attached to the housing proximate to the routing hardware, wherein the one or more adapters receive the connectorized outside fiber optic drop and the connectorized inside fiber optic drop from the routing hardware, and provide communication between the connectorized outside fiber optic drop and the connectorized inside fiber optic drop, wherein the termination hardware comprises a clamp.

7. The fiber optic interface device of claim 3, wherein the routing hardware is shaped to keep the connectorized outside fiber optic drop and the connectorized inside fiber optic drop within a bend radius that prevents kinking.

8. The fiber optic interface device of claim 3, wherein the routing hardware comprises two opposing semicircular members.

9. The fiber optic interface device of claim 3, wherein the routing hardware comprises routing clips evenly spaced in a pattern.

10. The fiber optic interface device of claim 3, wherein the one or more adapters accommodate one of SC-type connectors, ST-type connectors, and FC-type connectors.

11. A fiber optic interface device comprising:

(a) a housing having a first port that receives a connectorized outside fiber optic drop and a second port that receives a connectorized inside fiber optic drop;

(b) termination hardware attached to the housing proximate to the first port and the second port, wherein the termination hardware secures the connectorized outside fiber optic drop and the connectorized inside fiber optic drop to the housing;

(c) routing hardware attached to the housing proximate to the termination hardware, wherein the routing hardware receives the connectorized outside fiber optic drop and the connectorized inside fiber optic drop from the termination hardware, stores slack of the connectorized outside fiber optic drop and the connectorized inside fiber optic drop, and routes the connectorized outside fiber optic drop and the connectorized inside fiber optic drop; and (d) one or more adapters attached to the housing proximate to the routing hardware, wherein the one or more adapters receive the connectorized outside fiber optic drop and the connectorized inside fiber optic drop from the routing hardware, and provide communication between the connectorized outside fiber optic drop and the connectorized inside fiber optic drop, wherein the connectorized outside fiber optic drop and the connectorized inside fiber optic drop each contain two fiber optic strands and the one or more adapters are two adapters that provide communication between the two fiber optic strands of the connectorized outside fiber optic drop and the two fiber optic strands of the connectorized inside fiber optic drop.

12. A method for connecting a connectorized outside fiber optic drop to a connectorized inside fiber optic drop as a part of a fiber to the home network, the method comprising the steps of:

(a) mounting a fiber optic interface device on a subscriber premises, the fiber optic interface device having routing hardware and an adapter;

(b) attaching the connectorized outside fiber optic drop and the connectorized inside fiber optic drop to the fiber optic interface device;

(c) wrapping any extra lengths of the connectorized outside fiber optic drop and the connectorized inside fiber optic drop around the routing hardware;

(d) routing the connectorized outside fiber optic drop and the connectorized inside fiber optic drop to the adapter; and (e) inserting the connectorized outside fiber optic drop and the connectorized inside fiber optic drop into the adapter, wherein the connectorized outside fiber optic drop and the connectorized inside fiber optic drop have transition fittings, and the step of attaching comprises securing the transition fittings to the fiber optic interface device.

13. The method of claim 12, wherein the fiber optic interface device includes raised slots and a line proximate to each raised slot, and wherein the step of attaching comprises the steps of:
placing cable ties through the raised slots;
aligning the transition fittings with the line; and
tightening the cable ties around the transition fittings of the connectorized outside fiber optic drop and the connectorized inside fiber optic drop.

14. The method of claim 12, wherein the connectorized outside fiber optic drop and the connectorized inside fiber optic drop have pigtails attached to the transition fittings, and wherein the step of wrapping comprises wrapping the pigtails around the routing hardware.

15. The method of claim 14, wherein the pigtails are wrapped until a remaining length of each pigtail reaches only to the adapter.

16. A method for connecting a connectorized outside fiber optic drop to a connectorized inside fiber optic drop as a part of a fiber to the home network, the method comprising the steps of:

(a) mounting a fiber optic interface device on a subscriber premises, the fiber optic interface device having routing hardware and an adapter;

(b) attaching the connectorized outside fiber optic drop and the connectorized inside fiber optic drop to the fiber optic interface device;

(c) wrapping any extra lengths of the connectorized outside fiber optic drop and the connectorized inside fiber optic drop around the routing hardware;

(d) routing the connectorized outside fiber optic drop and the connectorized inside fiber optic drop to the adapter; and (e) inserting the connectorized outside fiber optic drop and the connectorized inside fiber optic drop into the adapter, wherein the fiber optic interface device has a first port and a second port for receiving the connectorized outside fiber optic drop and the connectorized inside fiber optic drop, respectively, wherein the first port and second port contain a grommet, and wherein the step of attaching comprises:
cutting a slit in each grommet;
placing the connectorized outside fiber optic drop through the slit in the grommet of the first port; and
placing the connectorized inside fiber optic drop through the slit in the grommet of the second port.

17. A fiber optic interface device for a fiber to the home (FTTH) network comprising:

(a) means for mounting the fiber optic interface device on a subscriber premises;

(b) means for attaching a connectorized outside fiber optic drop from a local terminal of the FTTH network and a connectorized inside fiber optic drop from an optical network terminal of the FTTH network to the fiber optic interface device;

(c) means for storing extra lengths of the connectorized outside fiber optic drop and the connectorized inside fiber optic drop inside the fiber optic interface device, and for routing the connectorized outside fiber optic drop and the connectorized inside fiber optic drop; and (d) means for connecting the connectorized outside fiber optic drop to the connectorized inside fiber optic drop.

* * * * *